United States Patent
Hayakawa

(10) Patent No.: US 10,198,950 B2
(45) Date of Patent: Feb. 5, 2019

(54) PARKING SUPPORT METHOD AND PARKING SUPPORT DEVICE

(71) Applicant: Nissan Motor Co., Ltd., Yokohama-shi, Kanagawa (JP)

(72) Inventor: Yasuhisa Hayakawa, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/769,635

(22) PCT Filed: Oct. 22, 2015

(86) PCT No.: PCT/JP2015/079889
§ 371 (c)(1),
(2) Date: Apr. 19, 2018

(87) PCT Pub. No.: WO2017/068695
PCT Pub. Date: Apr. 27, 2017

(65) Prior Publication Data
US 2018/0308359 A1 Oct. 25, 2018

(51) Int. Cl.
*G08G 1/14* (2006.01)
*B60R 21/00* (2006.01)
(Continued)

(52) U.S. Cl.
CPC ............. *G08G 1/145* (2013.01); *B60R 21/00* (2013.01); *B60W 30/06* (2013.01); *B62D 15/02* (2013.01);
(Continued)

(58) Field of Classification Search
CPC .......... G08G 1/145; G08G 1/133; G08G 1/14; G08G 1/137; G08G 1/143; G09B 29/10;
(Continued)

(56) References Cited

U.S. PATENT DOCUMENTS

2004/0252034 A1* 12/2004 Slemmer .................. G08G 1/14
340/932.2
2009/0243888 A1* 10/2009 Kawabata ............ B62D 15/028
340/932.2
(Continued)

FOREIGN PATENT DOCUMENTS

JP 2004203359 A 7/2004
JP 2009205191 A 9/2009
(Continued)

*Primary Examiner* — Hung T Nguyen
(74) *Attorney, Agent, or Firm* — Young Basile Hanlon & MacFarlane, P.C.

(57) ABSTRACT

A parking assist method for assisting parking of a subject vehicle uses a parking assist apparatus comprising a controller that guides the subject vehicle to a parking space and a display that displays the parking space. The parking assist method comprises: specifying an available parking space into which the subject vehicle can be parked; displaying the available parking space on the display; when the available parking space is in a parking-unavailable state that represents a state in which the subject vehicle cannot be parked into the available parking space, determining whether or not the parking-unavailable state is canceled; and when the parking-unavailable state is canceled before a first time passes, maintaining a display form of the available parking space on the display.

12 Claims, 24 Drawing Sheets

(51) Int. Cl.
*B62D 15/02* (2006.01)
*G01C 21/36* (2006.01)
*G09B 29/10* (2006.01)
*B60W 30/06* (2006.01)

(52) U.S. Cl.
CPC ....... B62D 15/0285 (2013.01); *G01C 21/365* (2013.01); *G08G 1/14* (2013.01); *G08G 1/144* (2013.01); *G09B 29/10* (2013.01)

(58) Field of Classification Search
CPC ...... G01C 21/365; B60W 30/06; B60R 21/00; B62D 6/00
USPC ...................................... 340/932.2, 937, 943
See application file for complete search history.

(56) References Cited

U.S. PATENT DOCUMENTS

| | | | | |
|---|---|---|---|---|
| 2014/0132423 | A1* | 5/2014 | Choi | B60Q 9/006 340/932.2 |
| 2015/0170518 | A1* | 6/2015 | Rodriguez Garza | G08G 1/144 340/932.2 |
| 2017/0118307 | A1 | 4/2017 | Beaurepaire et al. | |

FOREIGN PATENT DOCUMENTS

| | | | |
|---|---|---|---|
| JP | 2011079372 | A | 4/2011 |
| JP | 2012048346 | A | 3/2012 |
| JP | 2013116698 | A | 6/2013 |
| WO | 2012143033 | A1 | 10/2012 |
| WO | 2015144396 | A1 | 10/2015 |

* cited by examiner

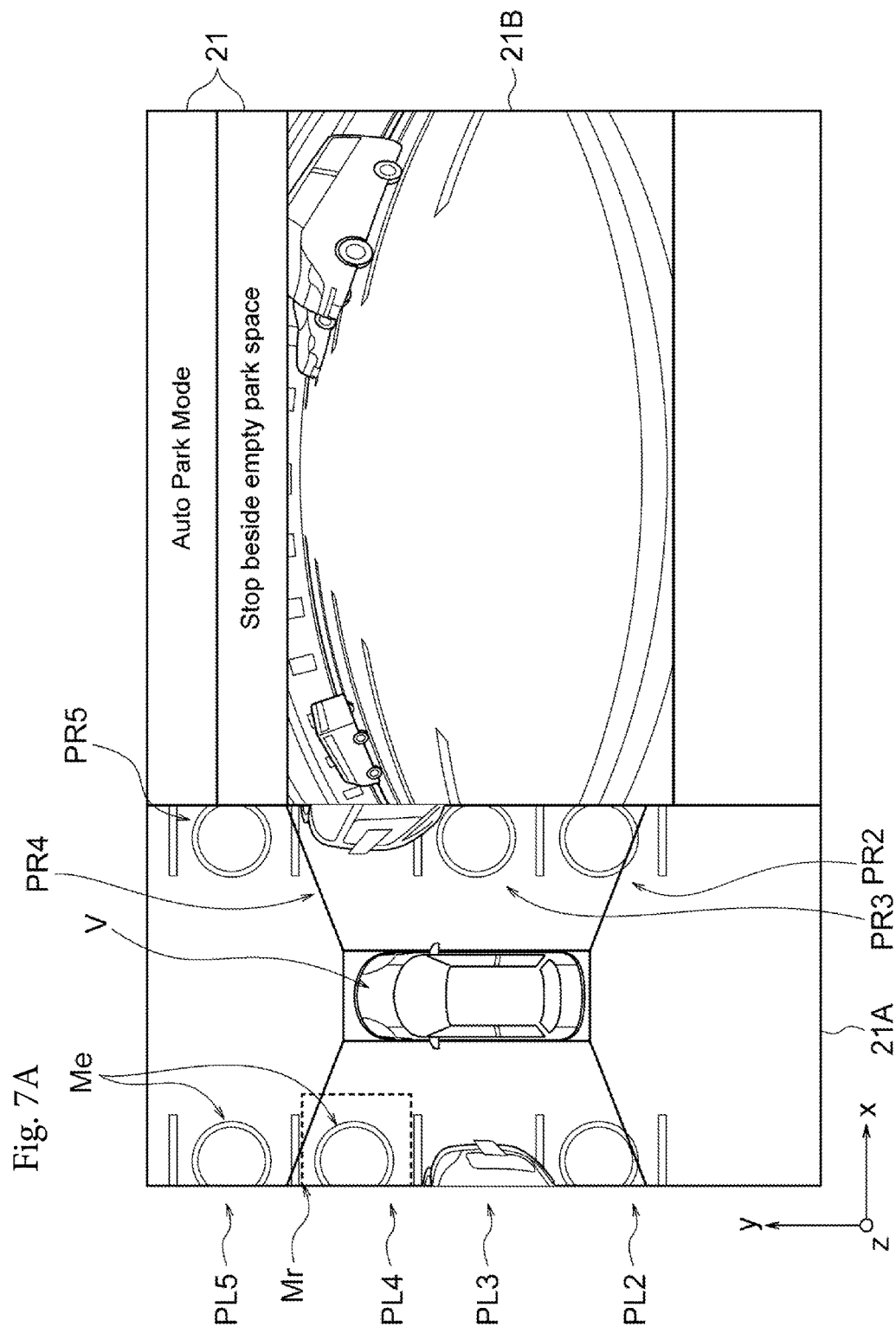

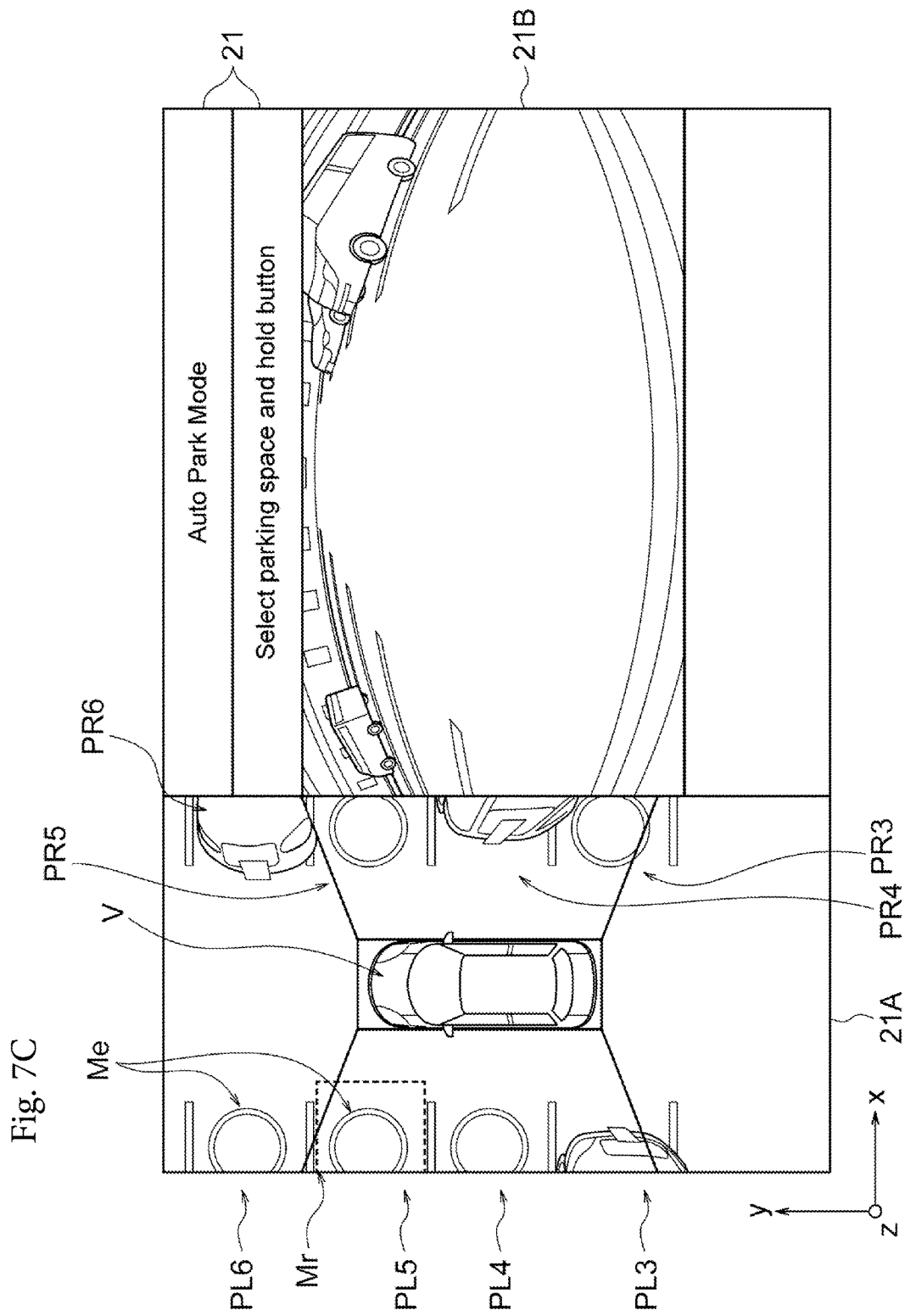

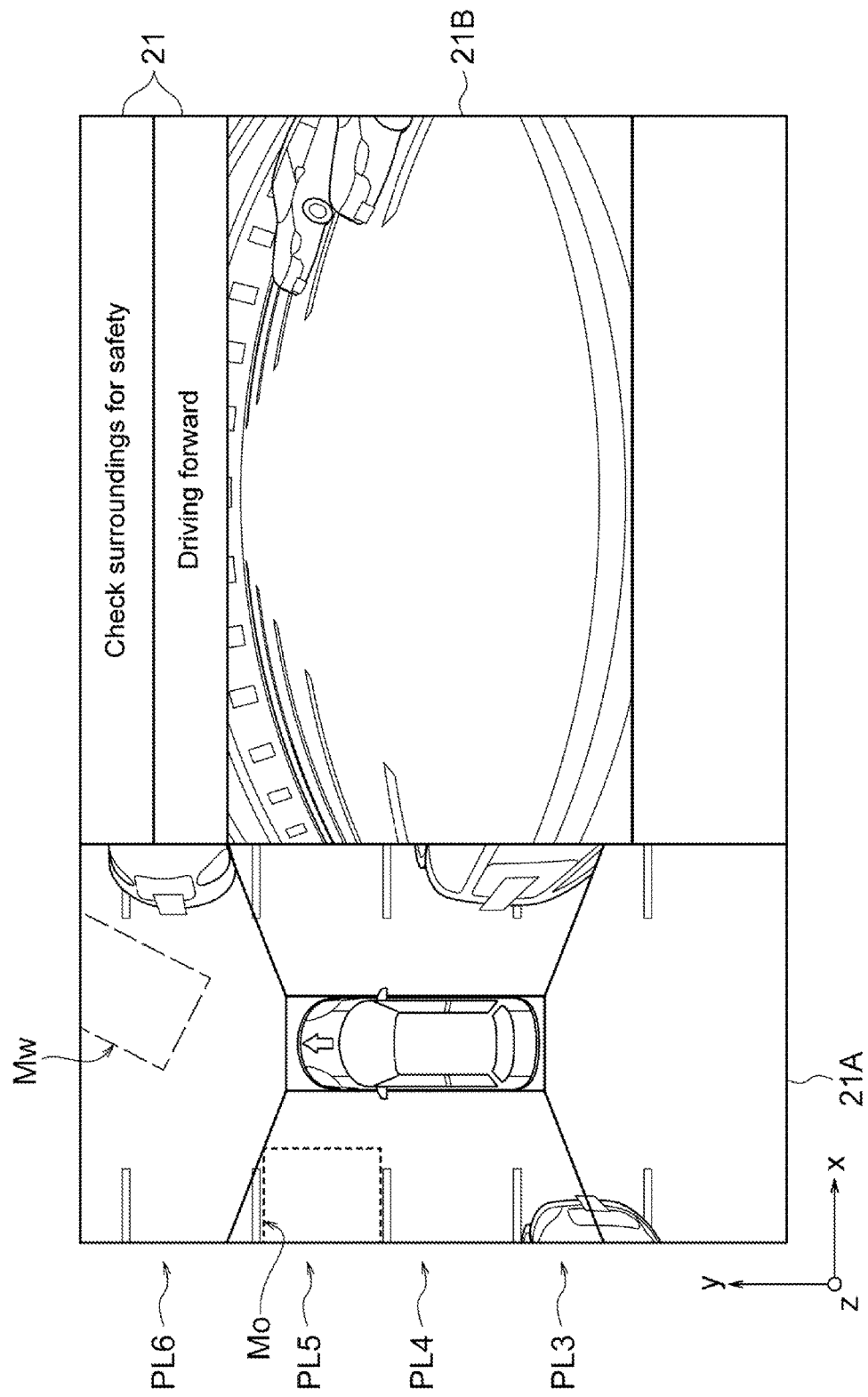

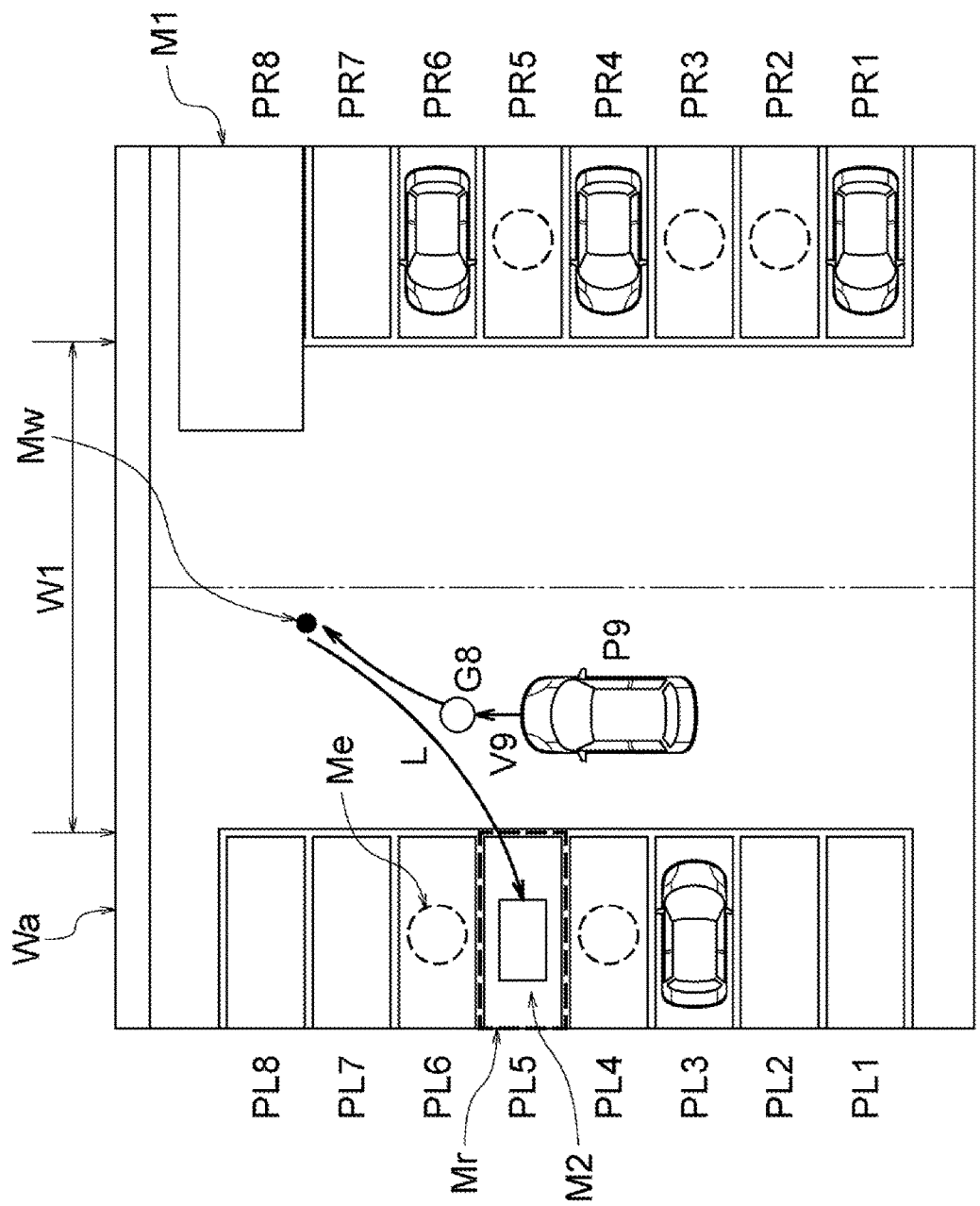

PARKING SUPPORT METHOD AND PARKING SUPPORT DEVICE

TECHNICAL FIELD

The present invention relates to a parking assist method and a parking assist apparatus.

BACKGROUND

Heretofore, a parking space recognition apparatus has been known as below. The parking space recognition apparatus detects spaces into which a subject vehicle can spatially enter, prioritize the spaces on the basis of preregistered unique information of the subject vehicle and/or the driver, and outputs a candidate parking space (see JP2009-205191A).

In the prior art, the candidate parking space is output on the basis of a priority level unique to the user regardless of the presence or absence of an obstacle in the parking space. Thus, unfortunately, an appropriate parking space cannot be presented to the driver and passengers in accordance with an obstacle. This may be problematic.

SUMMARY

A problem to be solved by the present invention is to provide a parking assist method or a parking assist apparatus with which an appropriate available parking space can be presented to the driver and passengers in accordance with an obstacle.

The present invention solves the above problem through specifying an available parking space into which the subject vehicle can be parked, detecting a state of the available parking space or a state of a travel route for the subject vehicle, determining whether or not the available parking space comes to a state in which parking is possible before a first time passes on a basis of the detected state of the available parking space or the detected state of the travel route for the subject vehicle; and, when the available parking space comes to the state in which parking is possible, maintaining a display form of the available parking space on the display The present invention has an effect that an appropriate available parking space can be presented to the driver and passengers in accordance with an obstacle because, when the subject vehicle is parked into the recommended available parking space, the display form of the recommended available parking space on the display is controlled in accordance with the state of an obstacle that interferes with the parking operation.

BRIEF DESCRIPTION OF THE DRAWINGS

FIG. 7A is a first view for describing an example of a display screen in the parking assist process according to the embodiment;

FIG. 7C is a third view for describing an example of a display screen in the parking assist process according to the embodiment;

FIG. 7E is a view for describing an example of a display screen in the parking assist process according to the embodiment;

FIG. 8B is a second view for describing an example of the parking assist process according to the embodiment;

DETAILED DESCRIPTION OF THE EMBODIMENTS

Hereinafter, embodiments of the present invention will be described with reference to the drawings.

In the present embodiment, the present invention will be described with reference to an example in which the parking assist apparatus according to the present invention is applied to a parking assist system equipped in a vehicle. The parking assist apparatus may also be applied to a portable terminal device (equipment such as smartphone and PDA) capable of exchanging information with onboard devices. The method of displaying parking assist information according to the present invention can be used in a parking assist apparatus. Parking assist information relating to the invention of the displaying method is specifically displayed using a display 21.

Figure 1:
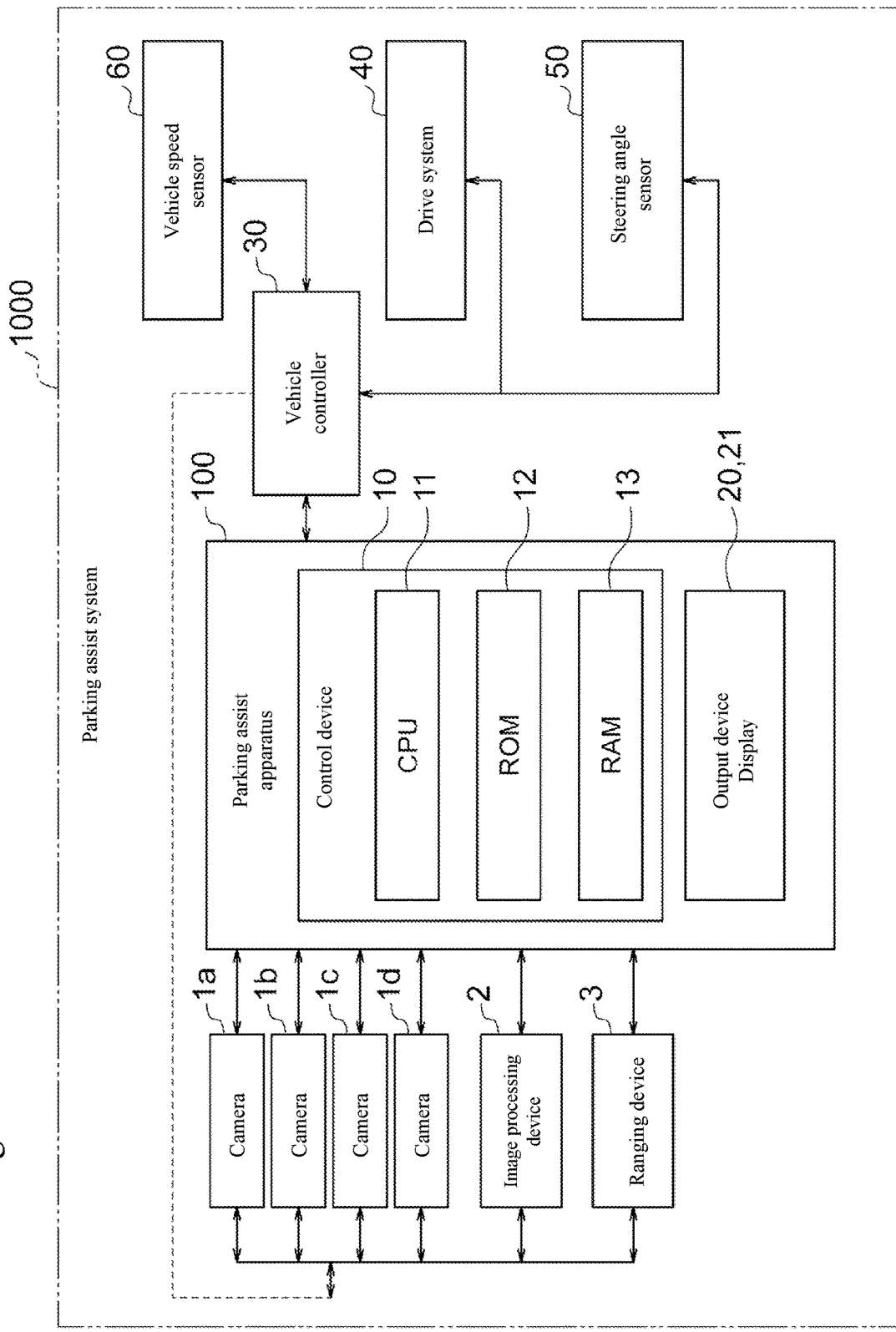
FIG. 1 is a block diagram illustrating an example of a parking assist system according to one or more embodiments of the present invention.

FIG. 1 is a block diagram of a parking assist system 1000 having a parking assist apparatus 100 according to one or more embodiments of the present invention. The parking assist system 1000 according to the present embodiment assists an operation of moving (parking) a subject vehicle into a parking space. The parking assist system 1000 according to the present embodiment includes cameras 1a to 1d, an image processing device 2, a ranging device 3, the parking assist apparatus 100, a vehicle controller 30, a drive system 40, a steering angle sensor 50, and a vehicle speed sensor 60. The parking assist apparatus 100 according to the present embodiment includes a control device 10 and an output device 20. The output device includes a display 21, a speaker 22, and a lamp 23. These components are connected to one another via a controller area network (CAN) or other in-vehicle LAN to mutually exchange information.

The control device 10 of the parking assist apparatus 100 according to the present embodiment is a specific computer comprising a ROM 12 that stores a parking assist program, a CPU as an operation circuit that executes the program stored in the ROM 12 to serve as the parking assist apparatus 100 according to the present embodiment, and a RAM 13 that serves as an accessible storage device.

The parking assist program according to the present embodiment is a program for execution of a control procedure of presenting available parking spaces, into which parking is possible, on the display 21 and assisting an operation to park the subject vehicle into a parking space set by a user. The parking assist apparatus 100 according to the present embodiment can be applied to automated parking in which all of the steering, accelerator, and brake are automatically operated thereby to park a vehicle automatically and can also be applied to semiautomated parking in which at least one operation of the steering, accelerator, and brake is manually performed and other operations are automatically performed for parking. In addition or alternatively, the parking assist apparatus 100 can be applied to a parking assist function with which a route to a parking space is presented to the user and the user operates the steering, accelerator, and brake to park the vehicle.

The control device 10 of the parking assist apparatus 100 according to the present embodiment has functions of executing an information acquisition process, an available parking space detection process, a recommended available parking space detection process, and a display control process. Each of the above processes is executed by cooperation of software for implementing the process and the above-described hardware.

Figure 2:
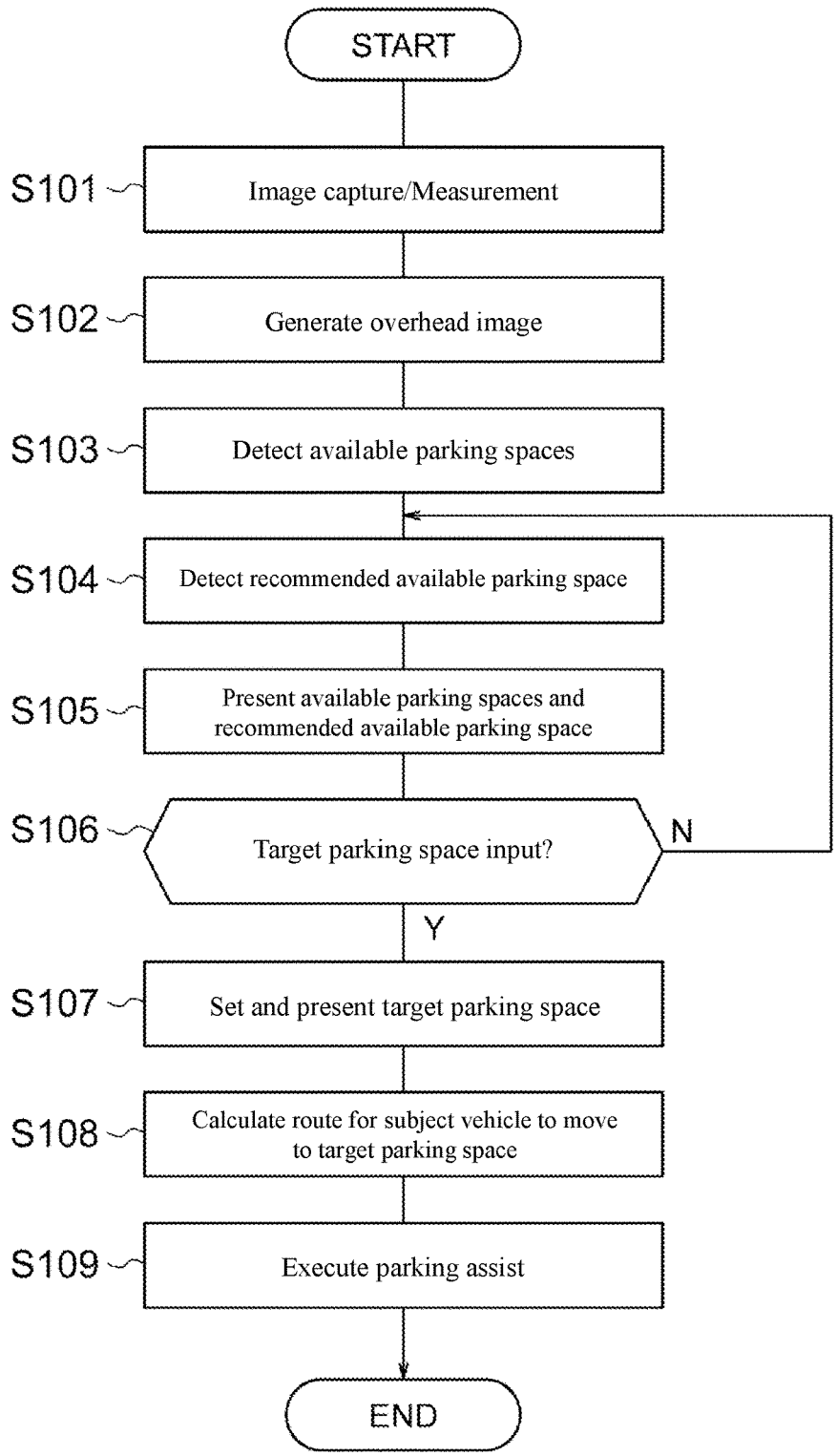
FIG. 2 is a flowchart illustrating an example of a control procedure in the parking assist system according to a first embodiment of the present invention.

FIG. 2 is a flowchart illustrating a control procedure of the parking assist process executed by the parking assist system 1000 according to the present embodiment. The trigger for starting the parking assist process is not particularly limited, and the parking assist process may be triggered by the operation of a start switch of the parking assist apparatus 100.

The parking assist apparatus 100 according to the present embodiment has a function for automatically moving the subject vehicle to an available parking space. In this process according to the present embodiment, a momentary-type switch such as a deadman switch is used. In the parking assist apparatus 100, the automated driving of the subject vehicle is executed when the deadman switch is pressed and the automated driving of the subject vehicle is suspended when the pressing of the deadman switch is released.

Specifically, in step 101, the control device 10 of the parking assist apparatus 100 according to the present embodiment acquires images captured by the cameras 1a to 1d attached to multiple sites of the subject vehicle. The cameras 1a to 1d capture images of boundary lines of available parking spaces around the subject vehicle and objects existing around the available parking spaces. The cameras 1a to 1d may be CCD cameras, infrared cameras, or other appropriate imaging devices. The ranging device 3 may be provided at the same position as any of the cameras 1a to 1d or may also be provided at a different position. The ranging device 3 may be a radar device, such as a millimeter-wave radar, laser radar and ultrasonic radar, or a sonar. The ranging device 3 detects the presence or absence of objects, positions of the objects, and distances to the objects on the basis of the received signal of the radar device. Such objects correspond to obstacles, pedestrian, and other vehicles around the vehicle. The received signal is used to determine whether or not the parking space is empty (whether or not a vehicle is parked in the parking space). Obstacles may be detected using the motion stereo technique by the cameras 1a to 1d.

Figure 3:
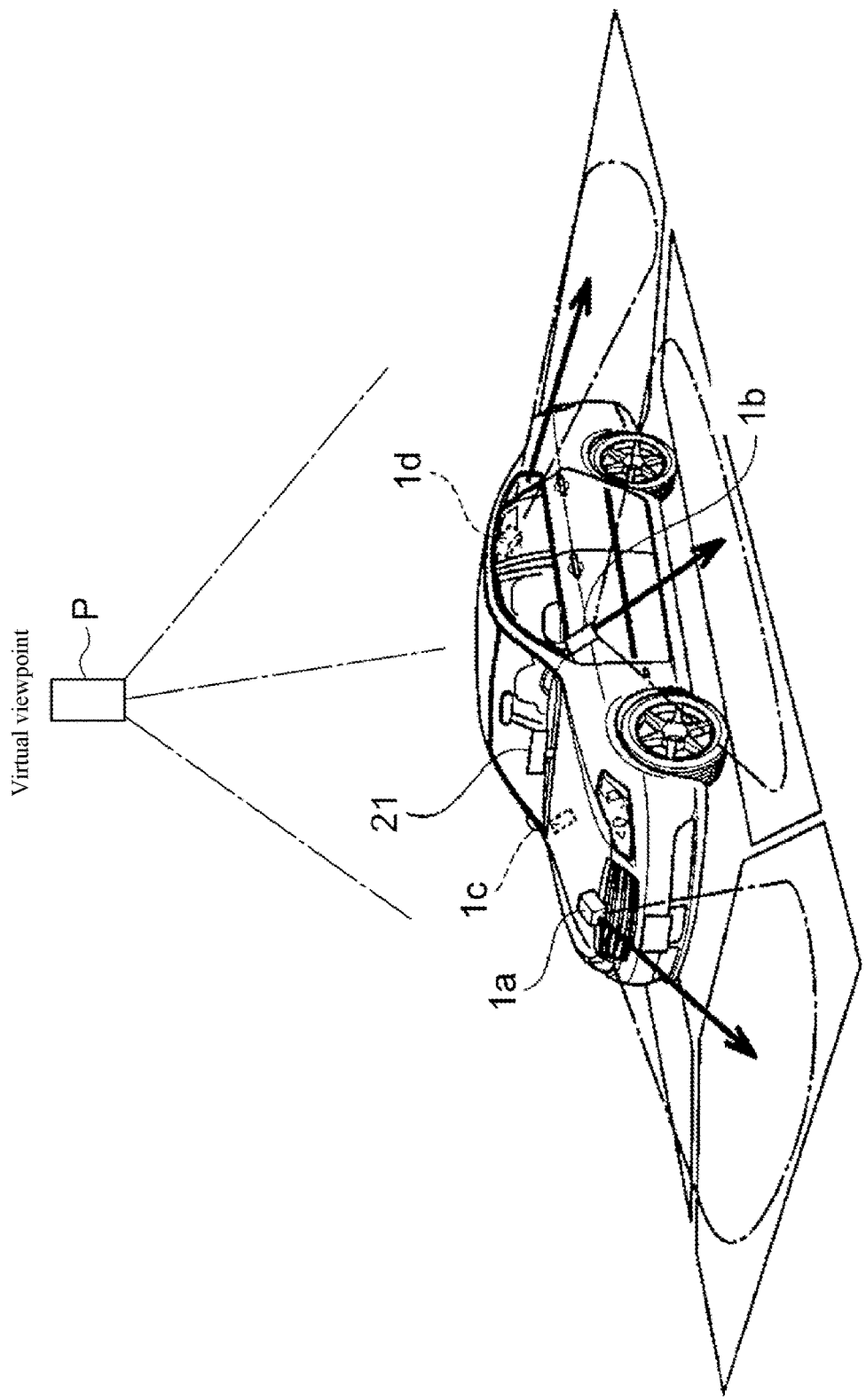
FIG. 3 is a view illustrating an example of positions at which on-board cameras are arranged according to the embodiment.

FIG. 3 is a view illustrating an exemplary arrangement of the cameras 1a to 1d disposed on the subject vehicle. In the example illustrated in FIG. 3, the camera 1a is disposed on the front grille part of the subject vehicle, the camera 1d is disposed in the vicinity of the rear bumper, and the cameras 1b and 1c are disposed on the lower parts of the right and left door mirrors. The cameras 1a to 1d may each be a camera having a wide-angle lens with a wide view angle.

In step 101, the control device 10 also acquires ranging signals from the ranging device 3, which may be a plurality of modules attached to multiple sites of the subject vehicle.

Figure 7B:
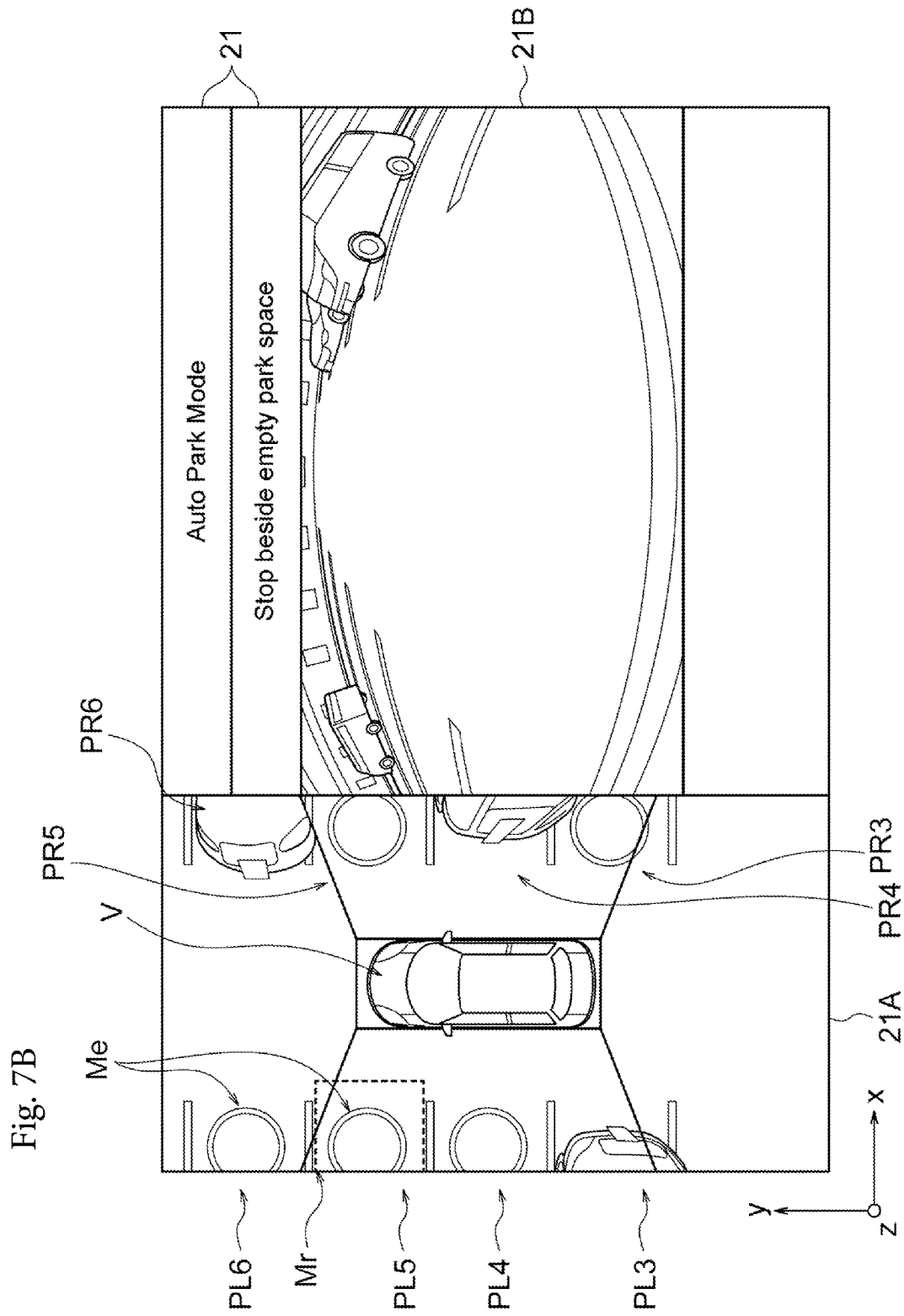
FIG. 7B is a second view for describing an example of a display screen in the parking assist process according to the embodiment.

In step 102, the control device 10 of the parking assist apparatus 100 controls the image processing device 2 to generate an overhead image. On the basis of the acquired plurality of captured images, the image processing device 2 generates an overhead image in which the surrounding state including the subject vehicle and the parking space for the subject vehicle to park is viewed from a virtual viewpoint P (see FIG. 3) above the subject vehicle. The image processing performed by the image processing device 2 may be conducted, for example, using a method as disclosed in "Development of Around View System, Proceedings of Society of JSAE Annual Congress, 116-07 (October 2007), pp. 17-22, SUZUKI Masayasu, CHINOMI Satoshi, TAKANO Teruhisa." Examples of a generated overhead image 21A are illustrated in FIGS. 7A and 7B, which will be described later. These figures each illustrate a display example that simultaneously displays the overhead image (top view) 21A around the subject vehicle and a monitoring image (normal view) 21B around the subject vehicle.

In step 103, available parking spaces Me are detected. The control device 10 detects the available parking spaces Me on the basis of the images captured by the cameras 1a to 1d and/or the data received by the ranging device 3. The control device 10 stores a "parking possible condition" for extracting the available parking spaces Me. The "parking possible condition" is defined from the viewpoint of extracting an available parking space into which parking is possible. The "parking possible condition" is preferably defined from the viewpoint of the distance from the subject vehicle, the viewpoint as to whether or not other vehicles are parked, and the viewpoint of presence or absence of obstacles. On the basis of the "parking possible condition," the control device 10 detects the available parking spaces Me into which the subject vehicle can be parked. The available parking spaces Me are available parking spaces into which the subject vehicle can be parked. The control device 10 specifies the available parking spaces Me on the basis of the images captured by the cameras 1a to 1d and/or the data received by the ranging device 3. In the above description, images of available parking spaces are captured by the on-board cameras and the available parking spaces Me are detected from the captured images, but information may be acquired from an external server and the available parking spaces may be specified from the acquired information.

A method of detecting the available parking spaces Me will be described below. The control device 10 determines whether or not the subject vehicle is traveling in an area that includes parking spaces (such an area will also be referred to as a "parking area," hereinafter), on the basis of the vehicle speed or positional information from a navigation system (not illustrated). For example, when the vehicle speed of the subject vehicle is a predetermined vehicle speed threshold or less and this state continues for a predetermined time or more, the control device 10 determines that the subject vehicle is traveling in a parking area. In addition or alternatively, when the detected positional information has an attribute that represents a parking area such as an area including parking spaces of a highway, for example, the control device 10 determines that the subject vehicle is traveling in the parking area. In the present embodiment, a determination may be made as to whether or not the detected area is an area including parking spaces, via communication with the outside of the vehicle, that is, via so-called road-to-vehicle communication or vehicle-to-vehicle communication.

When a determination is made that the subject vehicle is traveling in a parking area, the control device 10 detects white lines on the basis of the captured images acquired for generation of an overhead image. White lines represent boundary lines that define frames (regions) of parking spaces. The control device 10 performs edge detection on the captured images to calculate a luminance difference (contrast). The control device 10 specifies a pixel line having a luminance difference of a predetermined value or more from the overhead image and calculates the width and length of the line. The control device 10 also detects whether or not there are candidates of parking frame lines that have a higher possibility of being lines of parking frames than the specified line, around the portion in which the line is specified. For example, when a line having a larger luminance difference is newly specified, the newly specified line is detected as a line having a higher possibility of representing a parking frame line. In the present embodiment, frame lines representing parking spaces are not necessarily white, and other colors such as red may also be employed.

The ROM 12 of the control device 10 preliminarily stores information on the patterns of parking frames. The patterns of parking frames represent various shapes of parking spaces. For example, in the parking spaces of FIG. 6A which will be described later, the pattern of a parking frame is composed of three sides among the sides which form a rectangle. Examples of parking frame patterns include those for parallel parking as illustrated in FIG. 6B, which will be described later, and those for oblique-parking as illustrated in FIG. 6C, which will also be described later.

The control device 10 specifies lines located on the road surface from the overview image as candidates of parking frame lines using a known image processing technique such as pattern matching. When the specified candidates of parking frame lines satisfy all of the following three conditions (1) to (3), the control device 10 specifies the specified parking frame lines as those representing parking spaces. The following conditions are merely examples.

(1) Lines extracted as candidates of parking frame lines do not include a line having a length equal to or larger than a first line length threshold that is preliminarily set (e.g. a length corresponding to an actual distance of 15 [m]).

(2) Among lines extracted as candidates of parking frame lines, a set of adjacent two lines within a first line spacing range that is preliminarily set (e.g. a length corresponding to an actual distance of 3 to 5 [m]) does not include a set of lines having a length equal to or smaller than a second line length threshold that is preliminarily set (e.g. a length corresponding to an actual distance of 7 [m]).

(3) Among lines extracted as candidates of parking frame lines, a set of adjacent two lines within a second line spacing range that is preliminarily set (e.g. a length corresponding to an actual distance of 2.5 to 5 [m]) does not include a set of lines having a length equal to or smaller than a third line length threshold that is preliminarily set (e.g. a length corresponding to an actual distance of 15 [m]).

In case of specifying parking spaces that satisfy the above three conditions, the control device 10 determines whether or not obstacles are present in the specified parking spaces using the detection data from the ranging device 3. In addition, the control device 10 determines whether or not the specified parking spaces are those into which parking is possible by automated driving, on the basis of a travel route in the automated driving. For example, parking spaces for which a travel route in the automated driving cannot be ensured, such as parking spaces facing a wall, do not correspond to parking spaces into which parking is possible by the automated driving. Then, the control device 10 detects parking spaces, from among the specified parking spaces, in which obstacles do not exist and into which parking is possible by the automated driving, as the available parking spaces Me. Thus, the control device 10 detects the available parking spaces Me. In the above description, the control device 10 detects the available parking spaces while detecting parking frame lines, but the parking frame lines may not necessarily be detected to detect the available parking spaces. In addition or alternatively, the control device 10 may detect empty spaces having a certain range and detect the empty spaces as the available parking spaces and may also detect the available parking spaces using information about past results of parking. In addition or alternatively, when parking spaces satisfy a predetermined condition, the control device 10 may detect the parking spaces satisfying the predetermined condition as the available parking spaces.

Figure 4A:
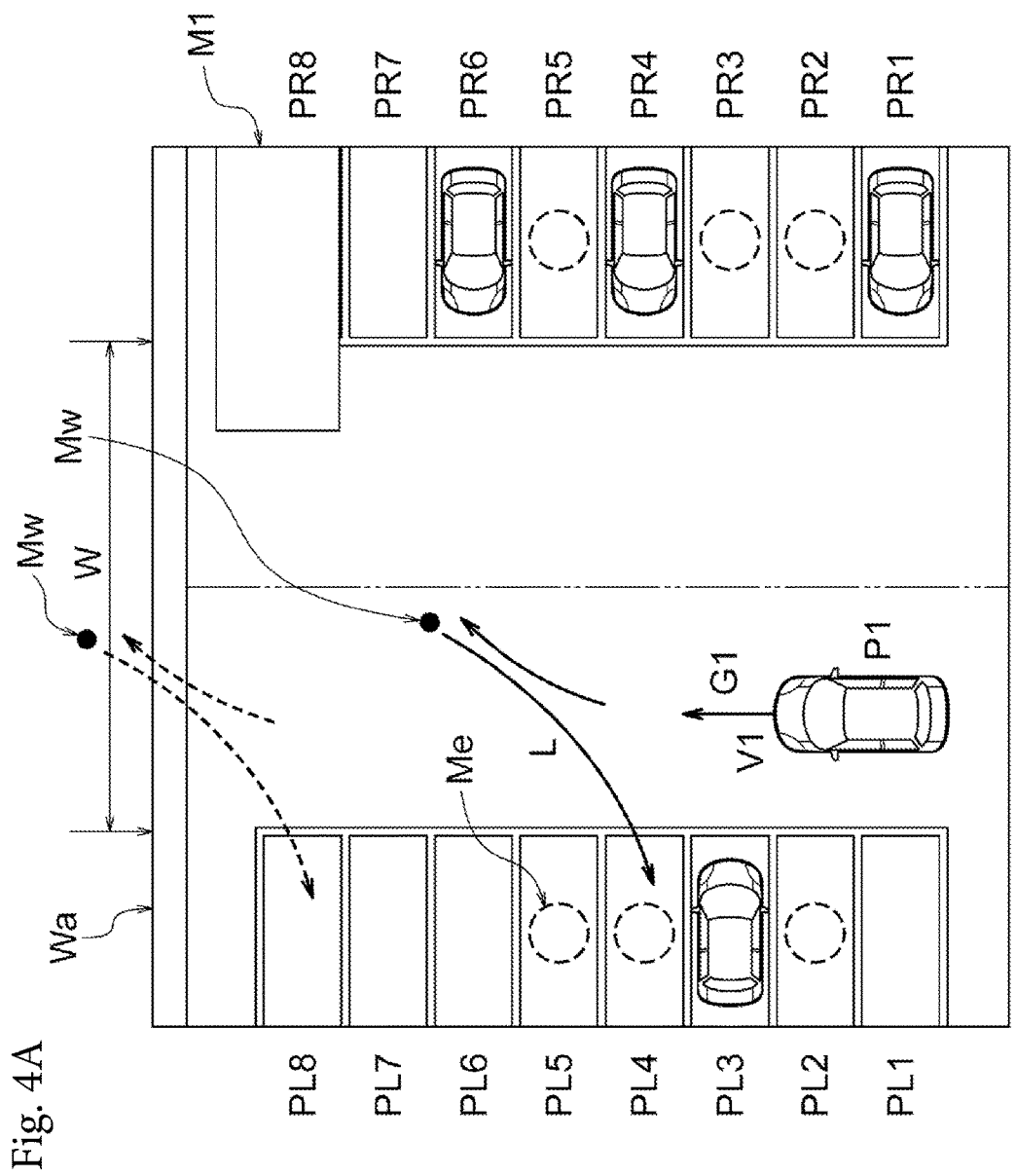
FIG. 4A is a first view for describing an example of a parking assist process according to the embodiment.

FIG. 4A is a first view for describing an example of the parking assist process according to the present embodiment. It is assumed that, in FIG. 4A, the position of the subject vehicle traveling is P1 and the vehicle speed is V1. Arrows L represent a travel route when the vehicle is parked by automated driving. Dotted circles represent the available parking spaces Me detected at the position P1.

In FIG. 4A and in FIGS. 4B to 4D which will be described later, the movement of the subject vehicle is represented in a temporal sequence, and the position of the subject vehicle moves from FIG. 4A in the order of FIG. 4B, FIG. 4C, and FIG. 4D. FIG. 4E, which will be described later, is not continuous with FIGS. 4A to 4D in the temporal sequence.

The travel route L is a route on which the subject vehicle moves from the current position G1 to an intermediate position Mw located ahead of the subject vehicle and reverses to complete the parking maneuver into a parking space PL. Such parking maneuver includes one or more turns for parking. In FIG. 4A, an obstacle M1 exists on the parking space PR8, and the control device 10 therefore does not detect the parking space PR8 as an available parking space Me. With regard to the parking space PL8, a travel route cannot be ensured in the automated driving because a wall Wa interferes with the travel route (corresponding to dotted arrows in FIG. 4A), and the parking space PL8 is therefore not a parking space suitable for the automated driving. Accordingly, the control device 10 does not detect the parking space PR 8 as an available parking space Me. Other vehicles are parked in the parking spaces PR1, PR4, PR6, and PL3, and the control device 10 therefore does not detect them as available parking spaces Me. The control device 10 detects the parking spaces PL1, PL2, PL4 to PL7, PR2, PR3, PR5, and PR7 as available parking spaces Me.

The control apparatus 10 sets a range that includes the parking spaces PL2 to PL5 and PR2 to PR5, among the parking spaces included in the images captured at the position P1 of the subject vehicle, as the detection range for available parking spaces Me. The detection range for available parking spaces Me during the vehicle's travel is not limited to the range of parking spaces PL2 to PL5 and PR2 to PR5, and may also be the range of parking spaces PL1 to PL8 and PR1 to PR8, for example.

Referring again to FIG. 2, in step 104, a recommended available parking space Mr is detected. The recommended available parking space Mr is an available parking space suitable for parking the subject vehicle. The control device 10 detects the recommended available parking space Mr in accordance with the traveling state of the subject vehicle from among the detected plurality of available parking spaces. The control device 10 stores the "parking recommendation condition" for extracting the recommended available parking space Mr. The "parking recommendation condition" is defined from the viewpoint of extracting a parking space with which a parking-related cost required for parking is low. The "parking recommendation condition" is preferably defined from the viewpoint of a time required for parking (required time for parking). On the basis of the "parking recommendation condition," the control device 10 extracts the recommended available parking space Mr, with which the parking-related cost is low, from among the available parking spaces.

A method of detecting the recommended available parking space Mr will be described below. The control device 10 evaluates the cost required for parking into each available parking space. The travel route used for evaluation of the cost is a route from the start position at which the parking assist process (automated driving) is started to the position of each available parking space Me. The control device 10 calculates the travel route when parking the subject vehicle into each available parking space Me. The control device 10 sets the start position for each available parking space Me. The control device 10 calculates a travel route from the start position to each available parking space Me. The number of travel routes for the automated driving is not limited to one, and the control device 10 may calculate a plurality of travel routes in accordance with the surrounding situations.

The parking-related cost for parking into each available parking space Me reflects a load such as the required time for parking which is required for moving the subject vehicle to the parking space by the automated driving.

The parking-related cost reflects a travel time for the subject vehicle to be parked into an available parking space Me by the automated driving and is obtained in accordance with the required time for parking. The required time for parking is a time when traveling by the automated driving along the travel route calculated for each available parking space Me. The parking-related cost may be obtained in accordance with the ease of entry into an available parking space Me. The ease of entry into an available parking space Me is determined in accordance with the travel distance, the number of operations (the number of turns for parking), the maximum steering angle, the vehicle speed, etc. For example, when the travel distance is long, when the number of turns for parking is large, when the maximum steering angle is large, and/or when the vehicle speed is high, it is not easy to enter an available parking space Me, and the parking-related cost is high. In other words, the ease of entry is evaluated for each available parking space, and on the assumption that an available parking space into which entry is easiest is the available parking space with which the parking-related cost is smallest, the available parking space may be set as the recommended available parking space. Factors of the parking-related cost may include not only the required time for parking but also other factors such as the certainty of parking in the automated driving. The parking-related cost may not necessarily be an index equivalent to the required time for parking and may also be calculated from the relative relationship with the number of turns for parking on a travel route, the length of a travel route, or the maximum steering angle. The parking-related cost may be calculated on the basis of each index, such as the required time for parking, the ease of entry into an available parking space Me, and the certainty of parking, or on the basis of a combination of two or more indices, or on the basis of a combination of all the indices.

In the following description of the present embodiment, the parking-related cost is calculated on the basis of the required time for parking. The travel route is different for each available parking space Me in accordance with the number of turns for parking, the travel distance, the maximum steering angle, etc. When the vehicle travels along a travel route by the automated driving, therefore, the required time for parking is different for each travel route. For example, the required time for parking will be shorter as the number of turns for parking is smaller, as the distance of a travel route is shorter, or as the maximum steering angle is smaller. As illustrated in FIG. 4A, on the assumption of parking into the available parking space PL6 or PL7, the distance from the vicinity of the parking space PL7 to the wall Wa is shorter than the distance from the vicinity of the parking space PL6 to the wall Wa. The number of turns for parking when parking into the parking space PL7 is therefore larger than the number of turns for parking when parking into the parking space PL6, and the required time for parking into the parking space PL7 is longer than the required time for parking into the parking space PL6 (the parking-related cost is higher in the former case).

The control device 10 then calculates a gaze point distance on the basis of the vehicle speed of the subject vehicle. The gaze point distance refers to a distance from the position of the subject vehicle to the position which the driver of the subject vehicle gazes on. In general, the higher the vehicle speed, the farther the driver gazes on, and the lower the vehicle speed, the closer the driver gazes on. From the viewpoint of recommending an available parking space in accordance with the observing point of the driver, the control device 10 sets a longer gaze point distance as the vehicle speed of the subject vehicle is higher, and sets a shorter gaze point distance as the vehicle speed of the subject vehicle is lower. This allows the parking assist into the available parking space to be executed in accordance with the intention of the driver. The gaze point distance does not have to be linear and may also be defined along a curve. When the gaze point distance is defined along a curve, the curvature of the curve may be associated with the steering angle.

Figure 5:
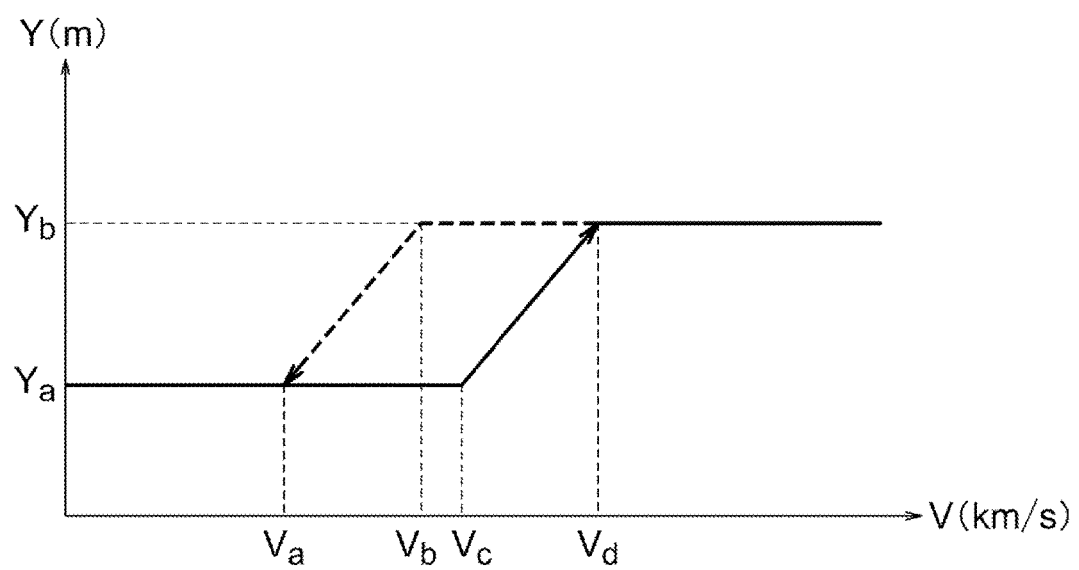
FIG. 5 is a graph illustrating the relationship between a vehicle speed (V [km]) and a gaze point distance (Y [m])

FIG. 5 is a graph illustrating the relationship between the vehicle speed (V [km/s]) and the gaze point distance (Y [m]). The solid line represents a characteristic when the vehicle speed increases while the broken line represents a characteristic when the vehicle speed decreases. As illustrated in FIG. 5, when the vehicle speed is Va or lower, the gaze point distance is Ya. When the vehicle speed increases from Va to Vc, the gaze point distance maintains Ya. Then, as the vehicle speed increases from the state of Vc, the gaze point distance increases in proportion to the vehicle speed within a range of Vc or higher and Vd or lower of the vehicle speed. When the vehicle speed is Vd or higher, the gaze point distance maintains Yb. On the other hand, when the vehicle speed lowers from the state of Vd, the gaze point distance maintains Yb until the vehicle speed returns to Vb from Vd. The gaze point distance decreases in proportion to the vehicle speed within a range of Va or higher and Vc or lower of the vehicle speed. Thus, the relationship between the vehicle speed and the gaze point distance has a hysteresis characteristic between the increasing direction and decreasing direction of the vehicle speed.

The ROM 12 of the control device 10 stores the relationship between the vehicle speed and the gaze point distance as a map. When acquiring the information on the vehicle speed from the vehicle speed sensor 60, the control device 10 refers to the map to calculate the gaze point distance corresponding to the vehicle speed.

Figure 4B:
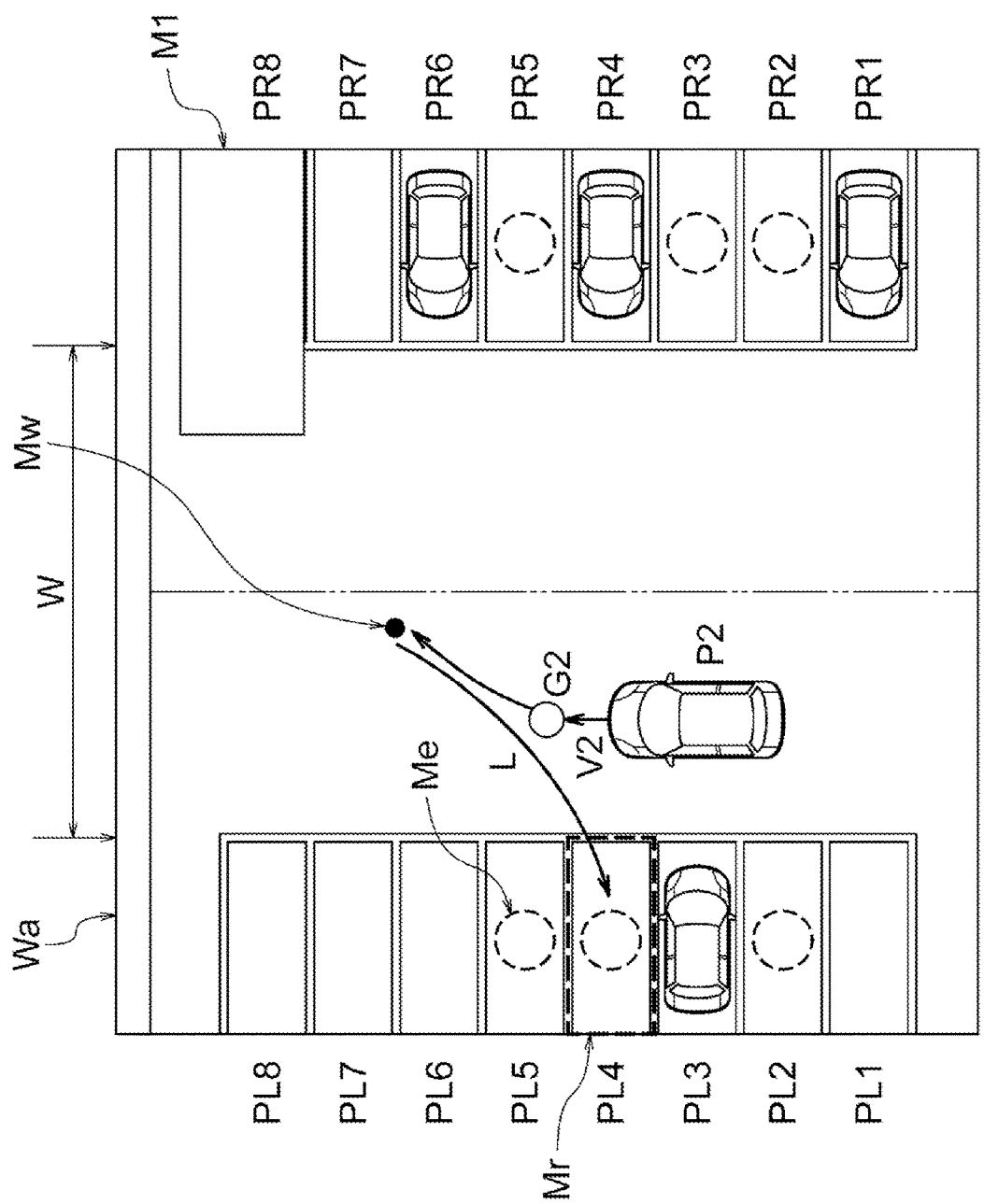
FIG. 4B is a second view for describing an example of the parking assist process according to the embodiment.
Figure 4C:
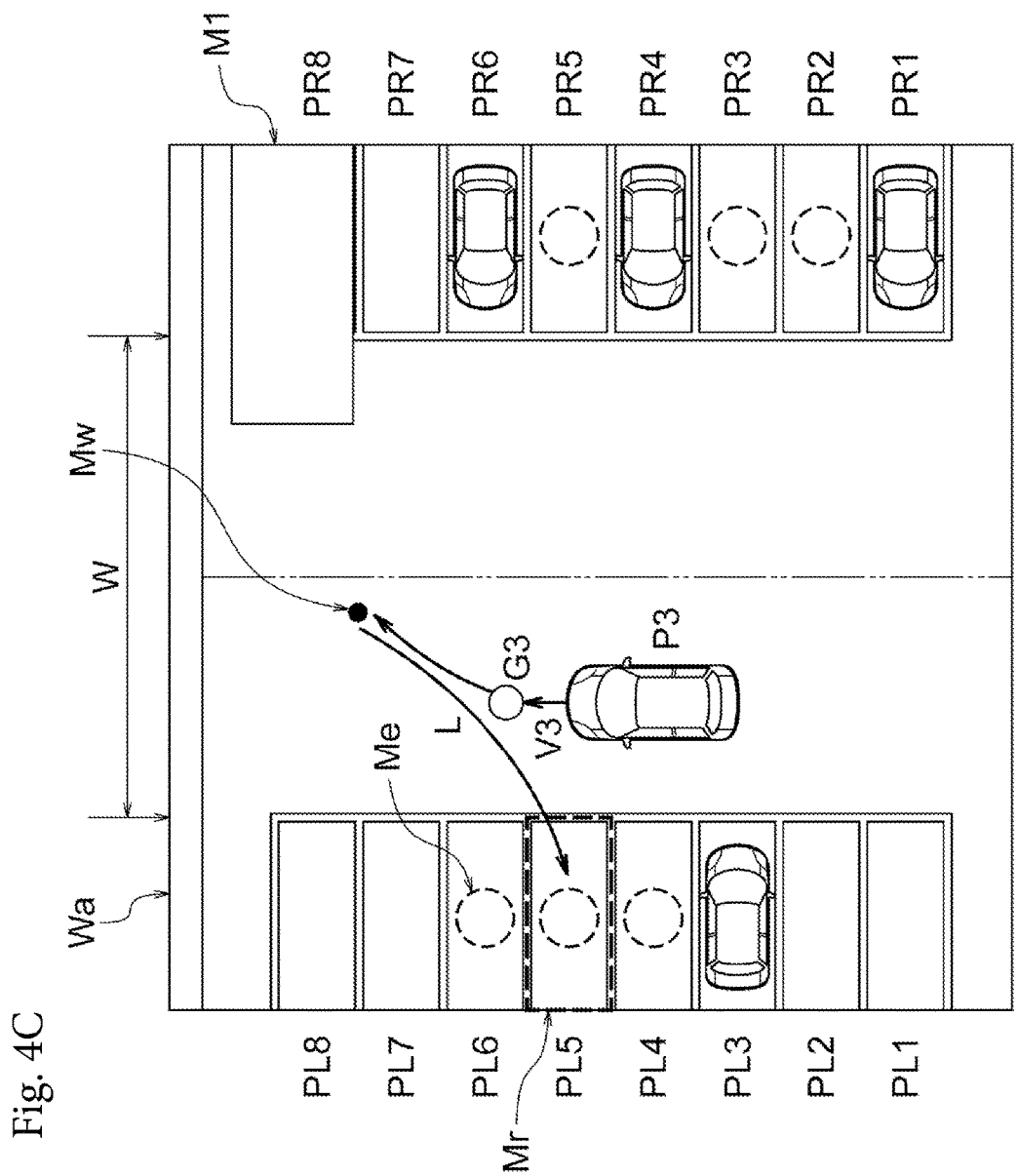
FIG. 4C is a third view for describing an example of the parking assist process according to the embodiment.

FIG. 4B illustrates a state in which the subject vehicle moves forward from the position P1 illustrated in FIG. 4A to a position P2. The speed of the subject vehicle at the position P2 is V2 (<V1). The control device 10 refers to the map to calculate the gaze point distance corresponding to the vehicle speed V2. The control device 10 specifies a point G2 that is separate from the position P2 by the gaze point distance, as a gaze point (G2). The subject vehicle is in a state of selecting a parking space with the lowered vehicle speed V2 (<V1). The distance between the gaze point G2 and the subject vehicle is shorter than the distance between the gaze point G1 illustrated in FIG. 4A and the subject vehicle because the vehicle speed is lowered.

In the state illustrated in FIG. 4B, the control device 10 detects a recommended available parking space from among the available parking spaces PL2, PL4, PL5, PR2, PR3, and PR5 in the vicinity of the gaze point G2. The control device 10 detects the recommended available parking space on the basis of the parking-related cost for each of the parking spaces PL2, PL4, PL5, PR2, PR3, and PR5.

The control device 10 then assigns numbers for identification to the available parking spaces Me in the vicinity of the gaze point G2. For example, the identification numbers are given in the order of proximity to the gaze point G2. The control device 10 calculates the parking-related cost for parking into each available parking space Me (the parking-related cost represents an index of the ease of entry into each available parking space Me). The control device 10 may read out the parking-related cost for parking which is previously calculated.

To evaluate the parking-related cost, the control device 10 calculates the required time for parking into each available parking space Me. In the example of FIG. 4B, the control device 10 calculates the parking-related cost (required time for parking) for each of the available parking spaces PL2, PL4, PL5, PR2, PR3, and PR5 and stores the parking-related cost such that it is associated with each identification number.

The control device 10 compares the required time for parking into each available parking space Me with a predetermined required time threshold. The required time threshold is a value that is preliminarily set and an upper limit of the required time when parking by the automated driving. When the required time for parking into an available parking space Me is longer than the required time threshold, the control device 10 does not detect the available parking space Me as the recommended available parking space Mr.

After detecting the available parking spaces Me with which the required time for parking is shorter than the required time threshold, the control device 10 sets an available parking space Me that is closest to the gaze point among the detected available parking spaces Me as the recommended available parking space Mr. In the example of FIG. 4B, the required time for parking into the parking space PL4 is shorter than the required time threshold, and the parking space PL4 is located closest to the gaze point. The control device 10 therefore sets the parking space PL4 as the recommended available parking space Mr. In the above-described embodiment, among the available parking spaces Me with which the required time for parking is shorter than the required time threshold, the parking space with the shortest gaze point distance is set as the recommended available parking space Mr, but another method may be employed to set the recommended available parking space Mr. For example, among the available parking spaces Me with which the required time for parking is shorter than the required time threshold, an available parking space Me with which the required time for parking is shortest may be set as the recommended available parking space Mr. In another embodiment, for example, it is assumed that, in the detection of the recommended available parking space Mr, available parking spaces Me can be set as the recommended available parking space Mr when the gaze point distance from the gaze point to the available parking space Me is within a predetermined distance. From among such available parking spaces Me, a parking space with which the required time for parking is shortest may be detected as the recommended available parking space Mr.

As described above, in the present embodiment, the gaze point distance is calculated on the basis of the vehicle speed, and a position separate from the current position of the subject vehicle by the gaze point distance is specified as the gaze point. Further, among the available parking spaces, an available parking space closest to the gaze point is set as the recommended available parking space Mr. That is, the gaze point distance based on the vehicle speed is calculated to specify the gaze point of the user, thereby specifying the recommended available parking space with consideration for the intention of the user (driving operation by the user). In the present embodiment, the parking-related cost is calculated for each available parking space, and among the available parking spaces, an available parking space with which the parking-related cost is low is set as the recommended available parking space Mr. That is, cost evaluation is employed to determine the state of the vehicle in the automated driving before the automated driving is executed, and the recommended available parking space is specified. Through this operation, in the present embodiment, an available parking space suitable for parking the subject vehicle is set as the recommended available parking space in accordance with the traveling state of the subject vehicle.

The control device 10 executes the detection process for the recommended available parking space Mr at a predetermined period. As illustrated in FIG. 4C, also when the subject vehicle moves forward to the position P3 at a vehicle speed of V3, the control device 10 detects a new recommended available parking space Mr. The control device 10 calculates a new gaze point G3 and the parking-related cost required for moving from the current position to each available parking space Me and detects the parking space PL5, with which the parking-related cost is lowest, as the recommended available parking space Mr.

In step 105, the available parking spaces Me and the recommended available parking space Mr are presented. The control device 10 controls the display 21 to display the set available parking spaces Me and the set recommended available parking space Mr thereby to present them to the driver and passengers. The display form on the display 21 will be described later.

In step 106, a determination is made as to whether or not a target parking space Mo is input. The target parking space Mo is an available parking space into which the vehicle is parked by the automated driving, and represents a location to be the target in the automated driving. The target parking space Mo is set on the basis of the operation by the driver or a passenger. For example, when the display 21 is a touch panel-type display, the driver or a passenger touches a portion representing a desired parking space thereby to designate the target parking space Mo, and information on the target parking space Mo is input to the control device 10.

When the target parking space Mo is input, the control flow proceeds to step 107. On the other hand, when the target parking space Mo is not input, the control flow returns to step 104, and the control flow from step 104 to step 106 is repeatedly executed.

When the target parking space Mo is input, this available parking space is set as the target parking space Mo in step 107.

In step 108, the control device 10 calculates a route for moving the subject vehicle to the target parking space Mo.

Figure 4D:
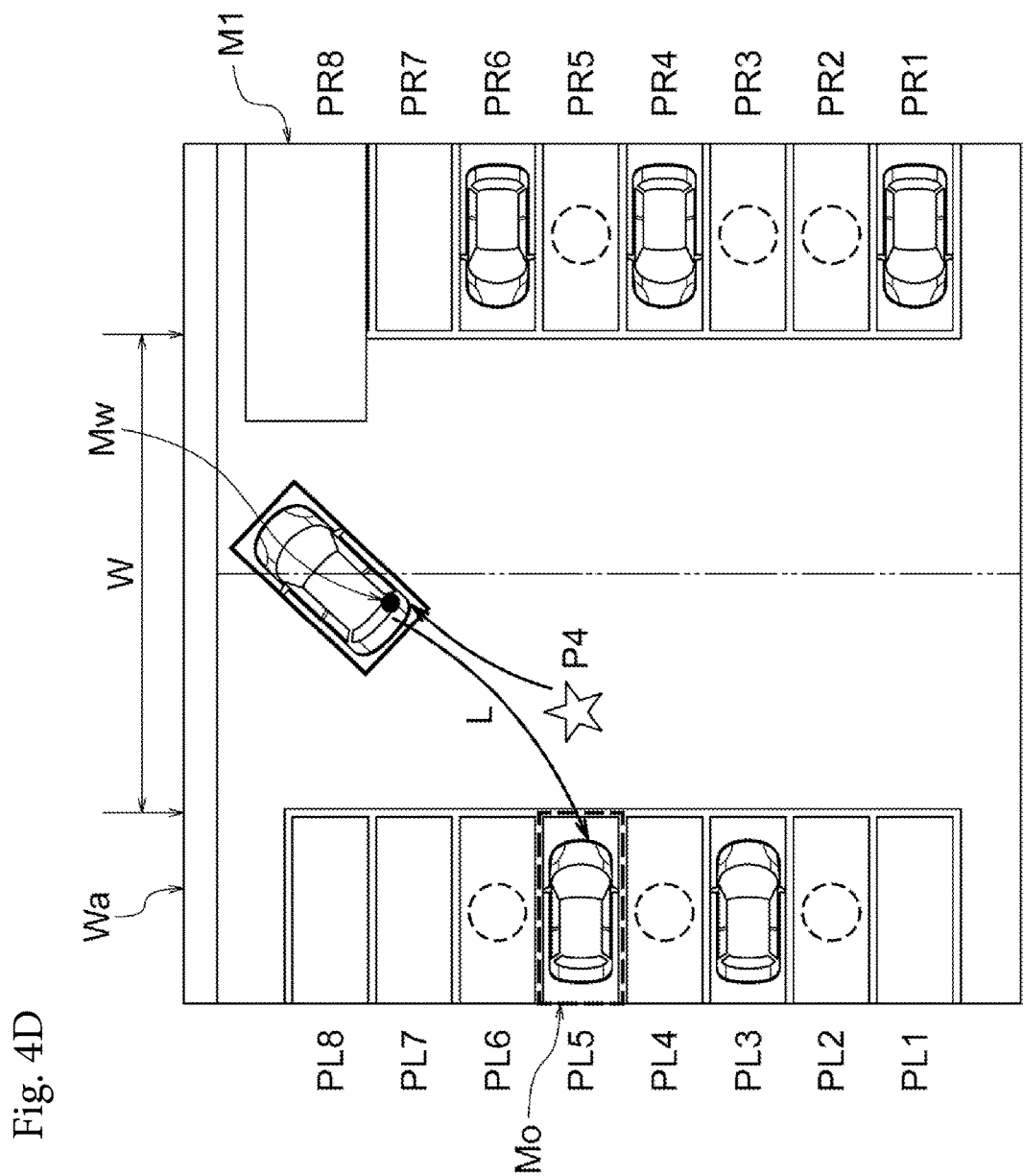
FIG. 4D is a fourth view for describing an example of the parking assist process according to the embodiment.
Figure 4E:
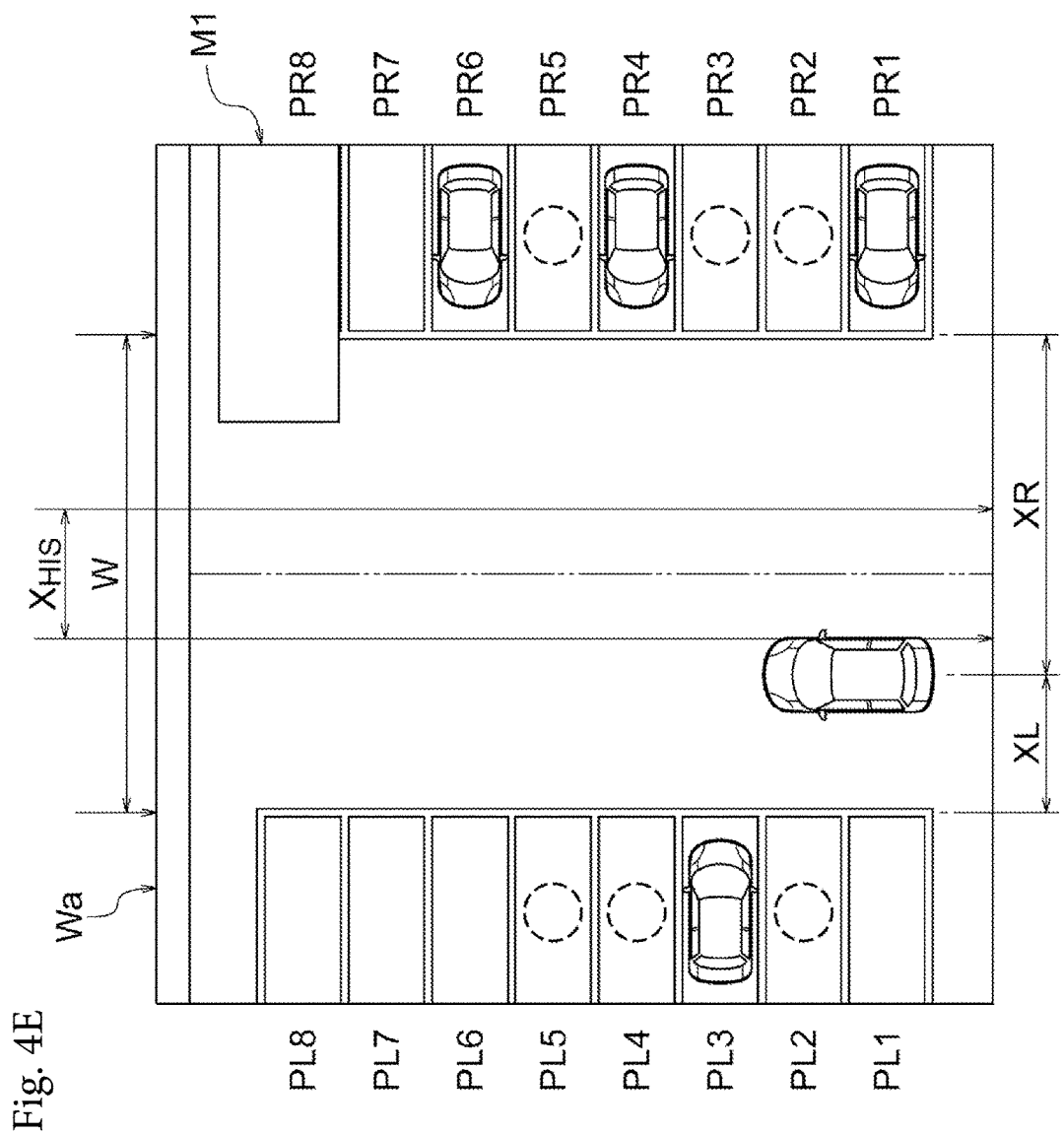
FIG. 4E is a view for describing an example of the parking assist process according to the embodiment.

FIG. 4D is a view illustrating a scene in which the available parking space PL5 is designated as the target parking space Mo. The control device 10 calculates a travel route for parking on the basis of the positional relationship between the position P4 of the subject vehicle at which the parking maneuver (movement) is started (automated parking start position) and the position of the target parking space Mo. Although not particularly limited, the control device 10 calculates the travel route to include two curves. The first curve lies from the stop position of the subject vehicle, that is, the start position (P4) at which the parking assist is started, to the turning position Mw at which the turn for parking is performed. The second curve lies from the turning position Mw to the target parking space Mo (PL5).

The control device 10 reads routes corresponding to the selected parking mode and calculates a travel route on the basis of the positional relationship between the position of the subject vehicle when starting the automated parking process and the position of the target parking space Mo. When the user presses the previously-described deadman switch during the operation of the automated parking mode, the control device 10 controls the vehicle controller 30 to execute the process of moving the subject vehicle to the target parking space Mo on the calculated travel route.

Figure 6A:
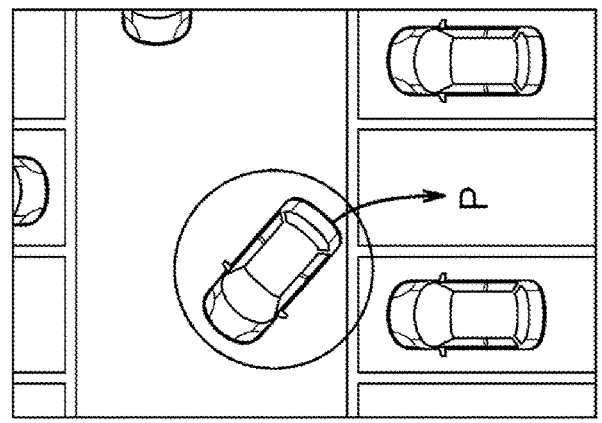
FIGS. 6A-6C are a set of views illustrating examples of parking patterns to which the parking assist process according to the embodiment is applied.
Figure 6B:
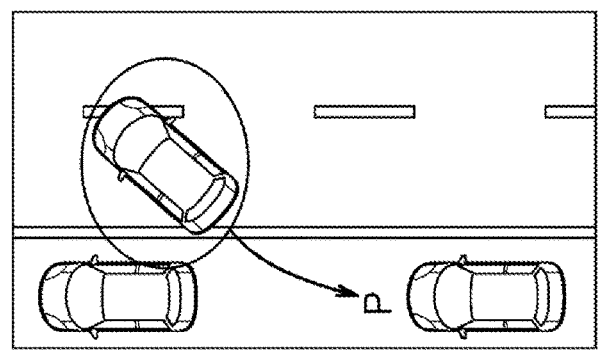
Figure 6C:
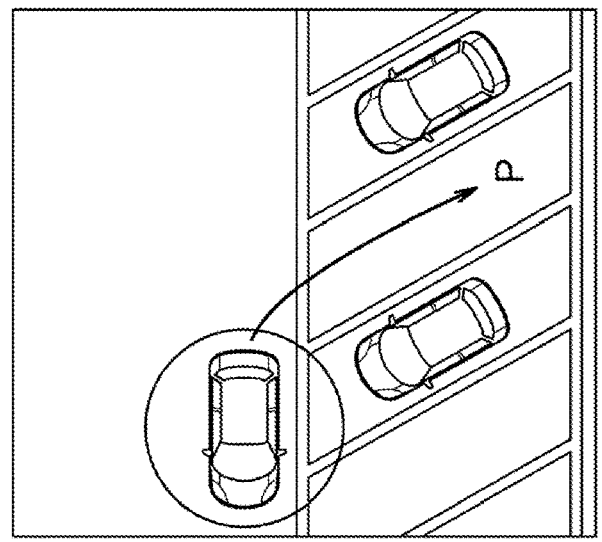

The control device 10 calculates the travel route corresponding to each of right-angle parking, parallel parking, and oblique parking illustrated in FIGS. 6A-6C, respectively. In the present embodiment, the travel route has been described as being calculated, but the present invention is not limited to this. In an alternative embodiment, a route corresponding to the type of the parking space is stored in a memory (ROM), and the route may be read out when parking. The parking mode (such as right-angle parking, parallel parking, and oblique parking) may be selected by the driver of the subject vehicle.

In step 109, the parking assist apparatus 100 according to the present embodiment executes the parking assist process or the automated parking process. The parking assist apparatus 100 according to the present embodiment controls the operation of the drive system 40 via the vehicle controller 30 so that the subject vehicle moves along the travel route.

The parking assist apparatus 100 according to the present embodiment includes a parking assist control unit. The parking assist control unit acquires shift range information from an AT/CVT control unit, wheel speed information from an ABS control unit, steering angle information from a steering angle control unit, engine speed information from an ECM, and other necessary information. On the basis thereof, the parking assist control unit calculates and outputs instruction information on the automated steering to the EPS control unit, instruction information such as warning to a meter control unit, etc. The control device 10 acquires information items, which are acquired by the steering angle sensor 50 of the steering apparatus of the vehicle and the vehicle speed sensor 60 and other sensors of the vehicle, via the vehicle controller 30.

The drive system 40 according to the present embodiment allows the subject vehicle to be parked into the target parking space Mo by driving based on the control command signals acquired from the parking assist apparatus 100. The steering apparatus according to the present embodiment is a drive mechanism that moves the subject vehicle in the right and left directions. The EPS motor included in the drive system 40 drives the power steering mechanism of the steering of the steering apparatus on the basis of the control command signals acquired from the parking assist apparatus 100 to control the steering amount and assists the operation when moving the subject vehicle to the target parking space Mo. The content of the parking assist and the scheme of operation are not particularly limited, and schemes known at the time of filing of this application can be appropriately applied.

When the parking assist apparatus 100 according to the present embodiment controls the subject vehicle to move to the target parking space Mo along the travel route calculated based on the position P4 of the subject vehicle and the position of the target parking space Mo, the operation of the accelerator/brake is automatically controlled on the basis of the designated control vehicle speed (set vehicle speed), and the operation of the steering apparatus is also automatically controlled in accordance with the vehicle speed. The parking assist apparatus 100 calculates command signals to the drive system 40 of the subject vehicle, such as an EPS motor, while feeding back the output value of the steering angle sensor 50 of the steering apparatus so that the travel trajectory of the subject vehicle coincides with the calculated travel route, and sends the command signals to the drive system 40 or to the vehicle controller 30 which controls the drive system 40. That is, during the parking assist according to the present embodiment, the steering operation and the accelerator/brake operation are automatically performed. It is also possible to perform a parking process by remote control that includes transmitting a setting command for the target parking space Mo, a parking process start command, a parking suspension command, etc. to the vehicle with no driver therein from the outside and performing the parking.

As will be understood, it is also possible for the driver to operate the accelerator/brake, and only the operation of the steering apparatus is automated. In this case, the parking assist apparatus 100 controls the drive system 40 on the basis of the set vehicle speed which is preliminarily calculated so that the subject vehicle follows the travel route to move, and controls the steering apparatus of the vehicle on the basis of the set steering angle which is also preliminarily calculated.

A method of presenting parking assist information in the parking assist apparatus 100 according to the present embodiment will be described below.

FIG. 7A is a first view for describing an example of a display screen in the parking assist process according to the present embodiment. FIG. 7B is a second view for describing an example of a display screen in the parking assist process according to the present embodiment. FIG. 7A illustrates a display screen when the subject vehicle is traveling at the position P2 of FIG. 4B. FIG. 7B illustrates a display screen when the subject vehicle is traveling at the position P3 of FIG. 4C. FIGS. 7A and 7B represent the parking assist information displayed when searching for a parking space into which the subject vehicle is parked. What are illustrated in FIGS. 7A and 7B are situations in which the subject vehicle searches for a parking space into which the subject vehicle is parked, while moving along the arrows.

In the display screen of FIG. 7A, an image (of boundary lines of parking spaces) that indicates the parking spaces PL2 to PL5 and PR2 to PR5 is displayed on the left-side overhead image (top view) 21A on the screen of the display 21. In the display screen of FIG. 7B, an image (of boundary lines of parking spaces) that indicates the parking spaces PL3 to PL6 and PR3 to PR6 is displayed on the left-side overhead image (top view) 21A on the screen of the display 21. The center of the overhead image (top view) 21A is displayed with an icon of the subject vehicle indicating the position of the subject vehicle. The monitoring image (normal view) can be displayed as any of images captured by different cameras 1a to 1d in accordance with the operation state of the subject vehicle. Examples illustrated in FIGS. 7A and 7B are each displayed as an image captured by the camera 1a which is disposed on the front grill part of the subject vehicle. When the subject vehicle moves back, the monitoring image may be displayed as an image captured by the camera 1d which is disposed in the vicinity of the rear bumper. The image 21C is an image for messages. In these examples, the overhead image 21A and the monitoring image 21B are simultaneously displayed on the display 21, but only the overhead image 21A may be displayed on the display 21, or only the monitoring image 21B may be displayed on the display 21.

The overhead image 21A is displayed with the available parking spaces Me and the recommended available parking space Mr. In a scene in which the subject vehicle searches for a target parking space while moving in the parking lot, the available parking spaces Me and the recommended available parking space Mr change as the subject vehicle moves. The parking assist apparatus 100 displays the available parking spaces Me and the recommended available parking space Mr which are sequentially detected. The parking assist apparatus 100 displays the available parking spaces Me with parking available marks in a circular shape and displays the recommended available parking space Mr with a recommendation mark in a rectangular shape.

As illustrated in FIGS. 7A and 7B, when the subject vehicle is moving, the available parking spaces Me and the recommended available parking space Mr sequentially change as the subject vehicle moves. When an available parking space Me or recommended available parking space Mr changes, the parking assist apparatus 100 changes the position of the parking available mark or recommendation mark and displays it.

Here, a display form of the recommended available parking space Mr when the subject vehicle moves while decelerating will be described. As described above, the control device 10 sets the recommended available parking space Mr for the available parking space Me which is closest to the gaze point. The gaze point distance varies in accordance with the vehicle speed of the subject vehicle.

The description will be made for a case in which the characteristic of the gaze point distance when the vehicle speed increases and the characteristic of the gaze point distance when the vehicle speed decreases follow the characteristic illustrated by the solid line of FIG. 5 rather than the hysteresis characteristic as illustrated in FIG. 5. It is assumed that, in the example of FIG. 4B, the recommended available parking space Mr set when the vehicle speed is Vd is the available parking space PL5. In such a case, as the vehicle speed becomes lower than Vd from the state of Vd, the gaze point distance becomes shorter than Yb, and the recommended available parking space Mr changes from the available parking space PL5 to another available parking space PL4. That is, despite the fact that the subject vehicle travels toward the recommended available parking space Mr (PL5) which is set before deceleration, the screen of the display 21 shows a movement such that the frame of the recommended available parking space Mr returns below on the screen (in the direction opposite to the travel direction of the subject vehicle, i.e. in the negative direction of the y-axis of FIG. 7A). To prevent such unnatural movement of the recommended available parking space Mr, in the present embodiment, hysteresis is given to the characteristic of the gaze point distance with respect to the vehicle speed.

With the hysteresis characteristic, the gaze point distance is maintained at Yb when the vehicle speed becomes lower than Vd from the state of Vd. The recommended available parking space Mr therefore remains at the position of the available parking space PL5 or moves to the available parking space PL6 on the travel direction side of the vehicle from the position of the available parking space PL5. That is, among a first available parking space (corresponding to the available parking space PL5 of FIG. 4A) and a second available parking space (corresponding to the available parking space PL4 of FIG. 4A) that are disposed side by side along a direction parallel to the travel direction of the subject vehicle (the y-axis direction of FIG. 7A), the first available parking space farther from the subject vehicle than the second available parking space is set as the recommended available parking space by the control device 10. Then, in the state in which the vehicle speed of the subject vehicle decreases, the control device 10 prohibits the recommended available parking space (corresponding to the available parking space PL5 of FIG. 4A) from moving from the first available parking space to the second available parking space (corresponding to the available parking space PL4 of FIG. 4A) on the display screen of the display 21. This can prevent the unnatural movement of the recommended available parking space Mr.

Next, in a display form of the recommended available parking space Mr, hunting in the lateral direction (the positive and negative directions of the x-axis of FIG. 7A) and control for preventing such hunting will be described.

Figure 4F:
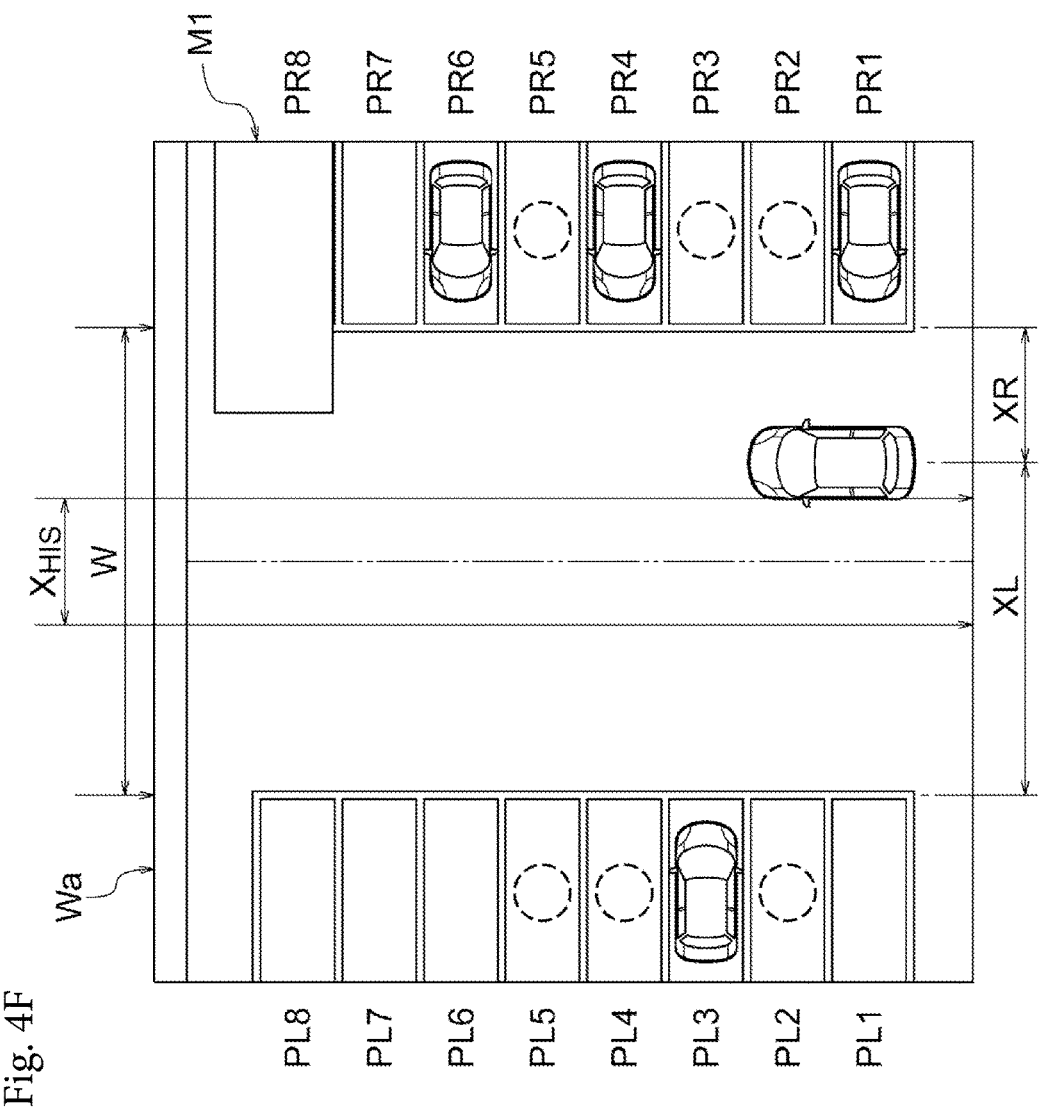
FIG. 4F is a view for describing an example of the parking assist process according to the embodiment.

FIGS. 4E and 4F are views for describing an example of the parking assist process according to the present embodiment. As described above, the recommended available parking space Mr changes its position on the display screen of the display 21 in accordance with the position of the vehicle. For example, in the parking area illustrated in FIG. 4E, it is assumed that the subject vehicle is traveling between a row of parking spaces on the left side and a row of parking spaces on the right side (the vicinity of the center in the lateral direction is indicated by a dashed-two dotted line). It is also assumed that, as illustrated in FIG. 4E, a number of parking spaces are empty in the parking area. When the subject vehicle is traveling on the left side of the center line indicated by the dashed-two dotted line, the position of the gaze point is located on the left side of the center line. On the other hand, when the subject vehicle is traveling on the right side of the center line indicated by the dashed-two dotted line, the position of the gaze point is located on the right side of the center line. Accordingly, when the subject vehicle travels in the vicinity of the center in the lateral direction with respect to the direction in which the parking spaces are arranged, the position of the subject vehicle may swing laterally across the center line, and the position of the gaze point may also swing laterally. Since the available parking space Me closest to the gaze point is set as the recommended available parking space Mr, the displayed frame of the recommended available parking space Mr will frequently move right and left. In the present embodiment, control is executed as below to prevent such hunting of the recommended available parking space Mr.

The control device 10 sets a fixed display mode for fixing the display region for the recommended available parking space Mr in accordance with the number of the available parking spaces Me. In the fixed display mode, the region in which the recommended available parking space Mr can be set is fixed to any of the left side and the right side. The control device 10 compares the number of the available parking spaces Me with a predetermined value. When the number of the available parking spaces Me is not smaller than the predetermined value, the control device 10 sets the display mode to the fixed display mode.

When the fixed display mode is set, the control device 10 selects one of right and left regions as a settable region for the recommended available parking space Mr in accordance with the traveling state of the subject vehicle. When the settable region is set, the control device 10 sets the recommended available parking space among the available parking spaces included in the settable region. The control device 10 calculates the distances from the parking spaces located on the sides of the subject vehicle to the subject vehicle as lateral distances (XL, XR). In the examples of FIGS. 4E and 4F, XL represents the lateral distance on the left side and XR represents the lateral distance on the right side. The control device 10 compares XL with XR. When XL is shorter than XR, the control device 10 sets the region on the left side as the settable region for the recommended available parking space Mr. When XR is shorter than XL, the control device 10 sets the region on the right side as the settable region for the recommended available parking space Mr.

After setting the settable region for the recommended available parking space Mr to the right or left, the control device 10 adds a length XHIS to a length (W/2) to give hysteresis to the setting condition when setting the right or left side with respect to the length of the lateral distance. The length (W/2) is a length obtained by halving the length of the lateral distance between the left-side parking spaces and the right-side parking spaces. The length XHIS is a length that defines a bias. When the left-side region is set as the settable region for the recommended available parking space Mr, the control device 10 compares the left-side lateral distance XL with a length (XHIS+W/2) to which the bias XHIS is added. When the left-side lateral distance XL is longer than the length (XHIS+W/2), the control device 10 changes the settable region for the recommended available parking space Mr from the left-side region to the right-side region. When the left-side lateral distance XL is not longer than the length (XHIS+W/2), the control device 10 maintains the state in which the left-side region is set as the settable region for the recommended available parking space Mr.

As illustrated in FIG. 4E, after the settable region for the recommended available parking space Mr is set to the left side, when the left-side lateral distance XL is not longer than the length (XHIS+W/2), the control device 10 maintains the state in which the settable region for the recommended available parking space Mr is set at the left side. On the other hand, as illustrated in FIG. 4F, after the settable region for the recommended available parking space Mr is set to the left-side region, when the subject vehicle travels on the right side of the center line and the left-side lateral distance XL is longer than the length (XHIS+W/2), the control device 10 changes the settable region for the recommended available parking space Mr from the left-side region to the right-side region. Through this operation, selection between the right side and the left side when set as the settable region can have a hysteresis characteristic with respect to the lateral position of the subject vehicle. For example, when the left-side region is set as the settable region for the recommended available parking space Mr, the recommended available parking space Mr is preferentially displayed on the left-side region as compared with the right side. This makes it possible to suppress the occurrence of hunting of the recommended available parking space Mr on the display screen of the display 21. In the above description, the left-side region is set as the settable region for the recommended available parking space Mr and the settable region for the recommended available parking space Mr is changed in accordance with the comparison result between the lateral distance (XL) of the subject vehicle and the length (XHIS+W/2), but when the right-side region is set as the settable region for the recommended available parking space Mr, the settable region for the recommended available parking space Mr is changed in accordance with the comparison result between the lateral distance (XR) of the subject vehicle and the length (XHIS+W/2).

When the number of the available parking spaces Me is less than the predetermined value, the control device 10 sets the display mode to a normal mode. In the normal mode, no settable region is set. When the parking area includes few empty parking spaces, prompt presentation of the empty parking spaces to the driver and passengers may be more important than preventing the hunting. Thus, the convenience of the system for the driver and passengers can be improved.

When the subject vehicle stops from the state of moving as illustrated in FIGS. 7A and 7B, the display screen of the display 21 becomes a screen as illustrated in FIG. 7C. FIG. 7C is a third view for describing an example of a display screen in the parking assist process according to the present embodiment. The display screen of FIG. 7C is a display screen when the vehicle stops at the position P3 in FIG. 4C.

As illustrated in the display screen of FIG. 7C, the user finds the messages included in the image 21C and can confirm that selection and input of the target parking space Mo are required. The user designates the parking space PL5, which is presented as the recommended available parking space Mr, as the target parking space Mo. The user touches the parking space PL5, which is displayed on the touch panel-type display 21, thereby to designate this parking space as the target parking space Mo. The display screen of the display is changed from the display screen of FIG. 7C to the display screen of FIG. 7D.

Figure 7D:
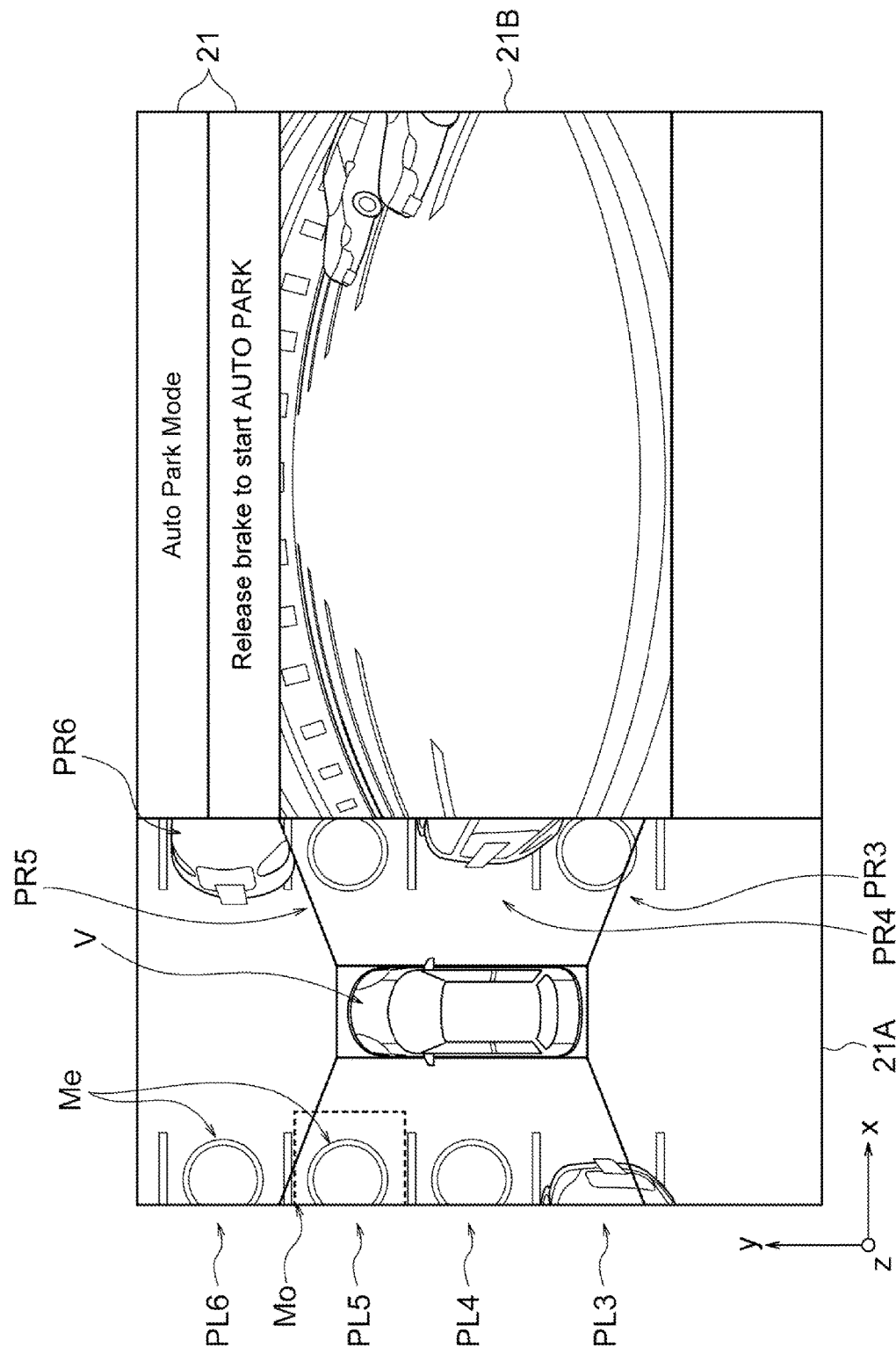
FIG. 7D is a fourth view for describing an example of a display screen in the parking assist process according to the embodiment.

FIG. 7D is a fourth view for describing an example of a display screen in the parking assist process according to the present embodiment. The display screen of FIG. 7D is a display screen when the vehicle stops at the position P4 in FIG. 4D.

The control device 10 controls the display 21 to display the display screen as illustrated in FIG. 7D thereby to present the target parking space Mo to the driver and passengers. The driver and passengers find the messages included in the image 21C and can confirm that the automated driving can be started.

FIG. 7E is a fifth view for describing an example of a display screen in the parking assist process according to the present embodiment. When the automated driving is started, the display screen of the display 21 becomes a screen as illustrated in FIG. 7E, and the subject vehicle moves forward. At this time, the image 21C is displayed with messages informing that the subject vehicle is moving forward by the automated driving and that the driver and passengers should gaze around the subject vehicle.

The above description is for the basic control process in the parking assist system according to the present embodiment. In the present embodiment, the following control is performed in addition to the basic control process.

Figure 8A:
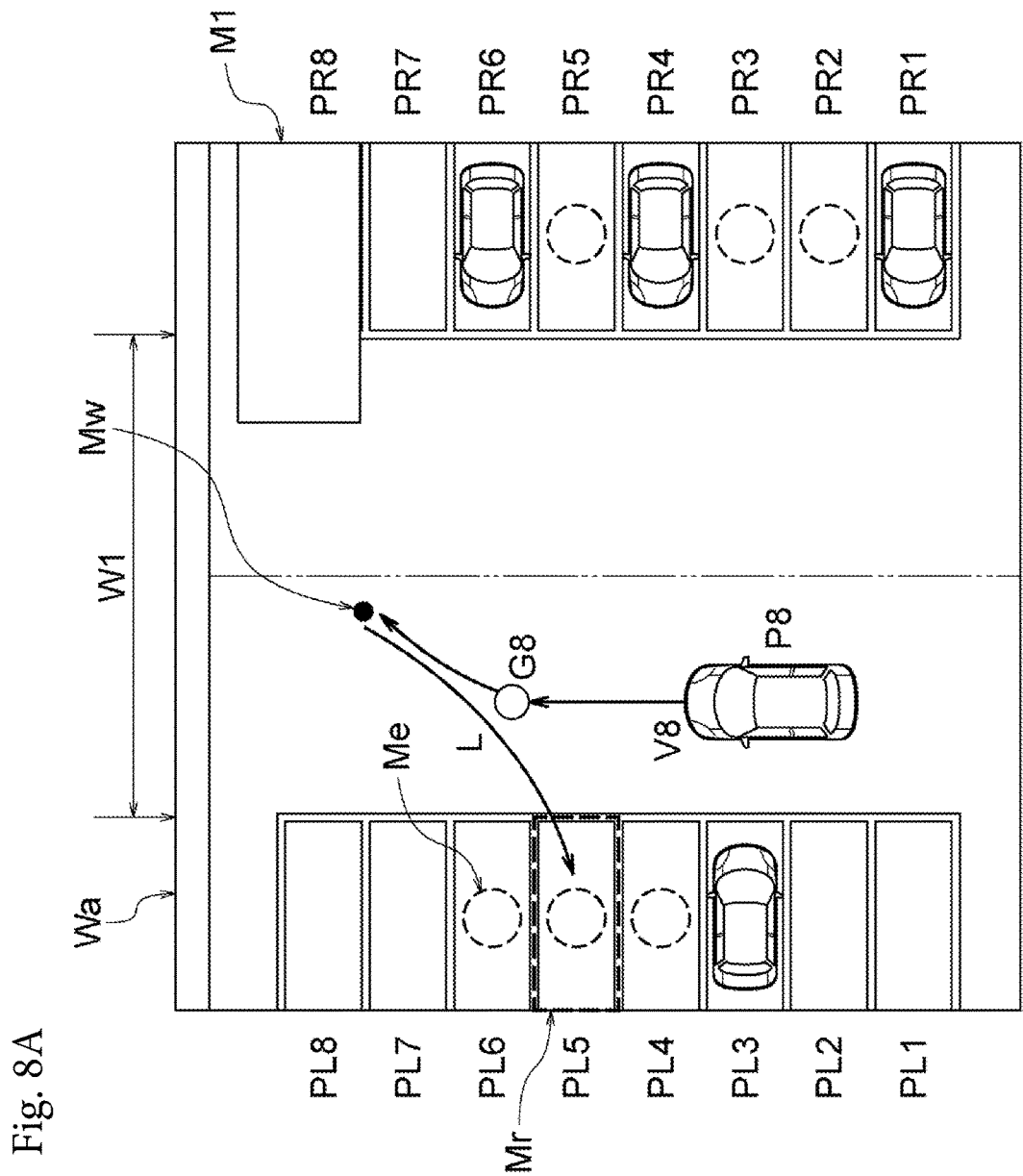
FIG. 8A is a first view for describing an example of a parking assist process according to the embodiment.

FIG. 8A is a first view for describing an example of the parking assist process according to the present embodiment. FIG. 8B is a second view for describing an example of the parking assist process according to the present embodiment. What are illustrated in FIGS. 8A and 8B are situations in which the subject vehicle searches for a parking space into which the subject vehicle is parked, while moving along the arrows. FIG. 8B illustrates a situation after a certain time passes from the time point of FIG. 8A. In FIG. 8A, P8 represents the position of the subject vehicle traveling, V8 represents the vehicle speed, Me represents the available parking spaces detected at the position P8, and Mr represents the recommended available parking space. In FIG. 8B, P9 represents the position of the subject vehicle traveling, V9 represents the vehicle speed, M2 represents an obstacle, Me represents the available parking spaces detected at the position P9, and Mr represents the recommended available parking space. In FIGS. 8A and 8B, G8 represents the gaze point and L represents the travel route when the vehicle is parked by the automated driving.

As illustrated in FIG. 8A, when the subject vehicle is traveling at the position P8, the control device 10 acquires information on the vehicle speed V8 and refers to the map to calculate the gaze point distance. The control device 10 specifies a position separate from the position P8 of the vehicle by the gaze point distance as the gaze point (G8). The control device 10 detects a parking space closest to the gaze point (G8) from among the available parking spaces as the recommended parking space Mr.

As illustrated in FIG. 8B, when the subject vehicle is traveling at the position P9, the control device 10 acquires information on the vehicle speed V9 and calculates the gaze point distance. The control device 10 specifies a point G8 separate from the position P9 of the vehicle by the gaze point distance as the gaze point (G8). As the vehicle speed decreases from V8 to V9, the gaze point distance becomes short, so the position of the gaze point G8 does not change even when the vehicle moves.

It is assumed that an obstacle such as an animal and person enters the parking space PL5, for example, while the vehicle is moving from the position P8 to the position P9, or an obstacle that was not able to be detected at the position P8 is detected while the vehicle is moving toward the position P9 or when the vehicle arrives at the position P9. As illustrated in FIG. 8B, when the obstacle M2 exists in the recommended available parking space Mr, the subject vehicle cannot be parked into the recommended available parking space Mr. Even when the obstacle M2 exists in the recommended available parking space Mr, if the obstacle M2 moves out of the recommended available parking space Mr before the subject vehicle enters the recommended available parking space Mr, the subject vehicle can be parked into the recommended available parking space Mr. In particular, when the obstacle M2 is a moving object such as an animal and person, the period during which the obstacle M2 stays in the recommended available parking space Mr may often be short. In such a case, before the subject vehicle is parked into the recommended available parking space Mr, the obstacle M2 moves out of the recommended available parking space Mr. It is therefore better to continue to present the parking space PL5 as the recommended available parking space Mr to the user rather than presenting another available parking space different from the parking space PL5 as the recommended available parking space Mr to the user.

Figure 8C:
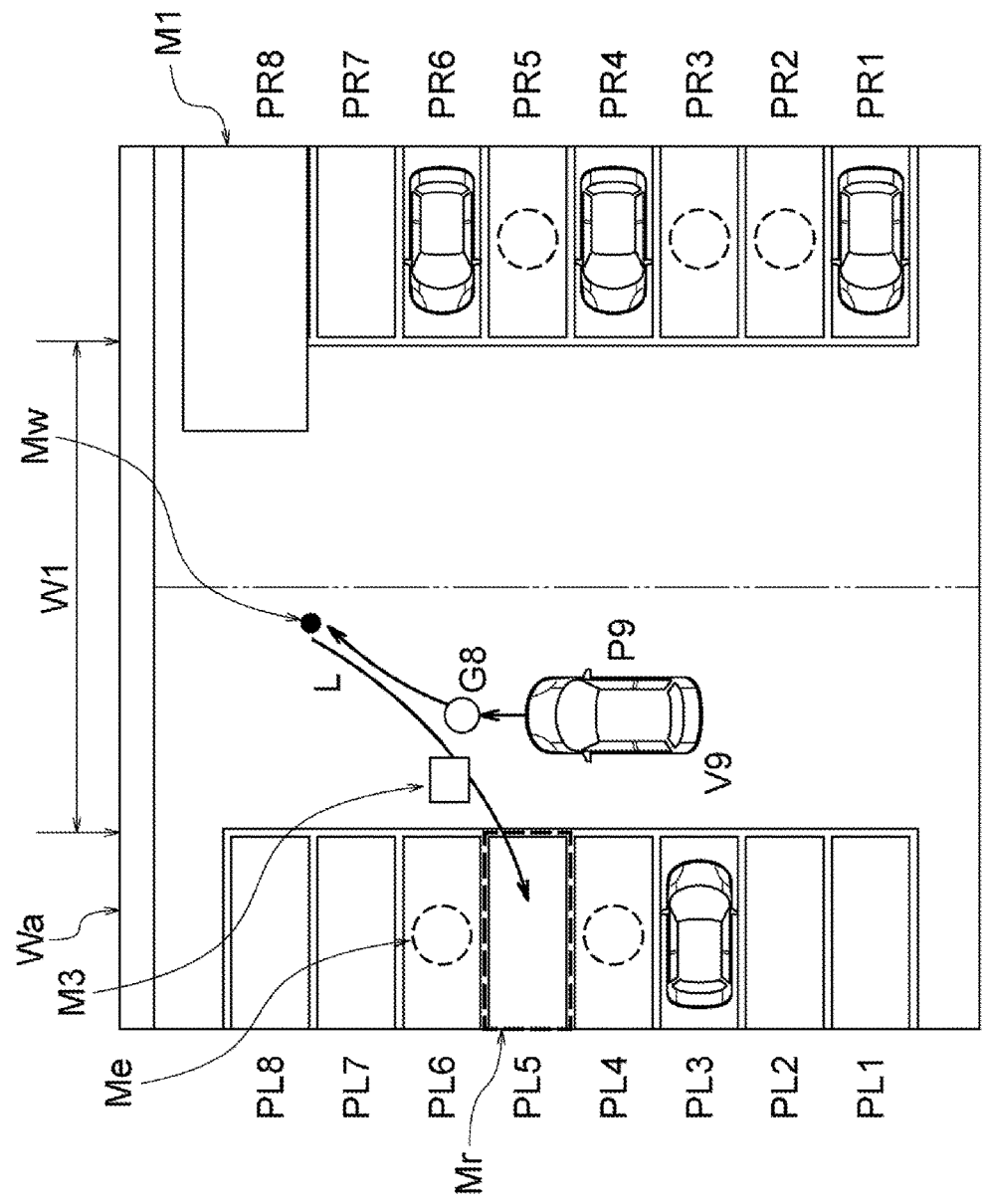
FIG. 8C is a third view for describing an example of the parking assist process according to the embodiment.

FIG. 8C is a third view for describing an example of the parking assist process according to the present embodiment. What is illustrated in FIG. 8C is a situation in which the subject vehicle searches for a parking space into which the subject vehicle is parked, while moving along the arrow. FIG. 8C illustrates a situation after a certain time passes from the time point of FIG. 8A. In FIG. 8C, P9 represents the position of the subject vehicle traveling, V9 represents the vehicle speed, M3 represents an obstacle, Me represents the available parking spaces detected at the position P9, Mr represents the recommended available parking space, G8 represents the gaze point, and L represents the travel route when the vehicle is parked by the automated driving.

It is assumed that an obstacle such as an animal and person enters the travel route L, for example, while the vehicle is moving from the position P8 to the position P9. As illustrated in FIG. 8C, when the obstacle M3 exists on the travel route L, the subject vehicle cannot be parked into the recommended available parking space Mr. Even when the obstacle M3 exists on the travel route L which is estimated for parking, if the obstacle M3 moves to a position apart from the travel route L before the subject vehicle travels to the position of the obstacle by the automated driving, the subject vehicle can be parked into the recommended available parking space Mr. In such a case, it is better to continue to present the available parking space PL5 as the recommended available parking space Mr to the user rather than presenting another available parking space different from the available parking space PL5 as the recommended available parking space Mr to the user.

Figure 9:
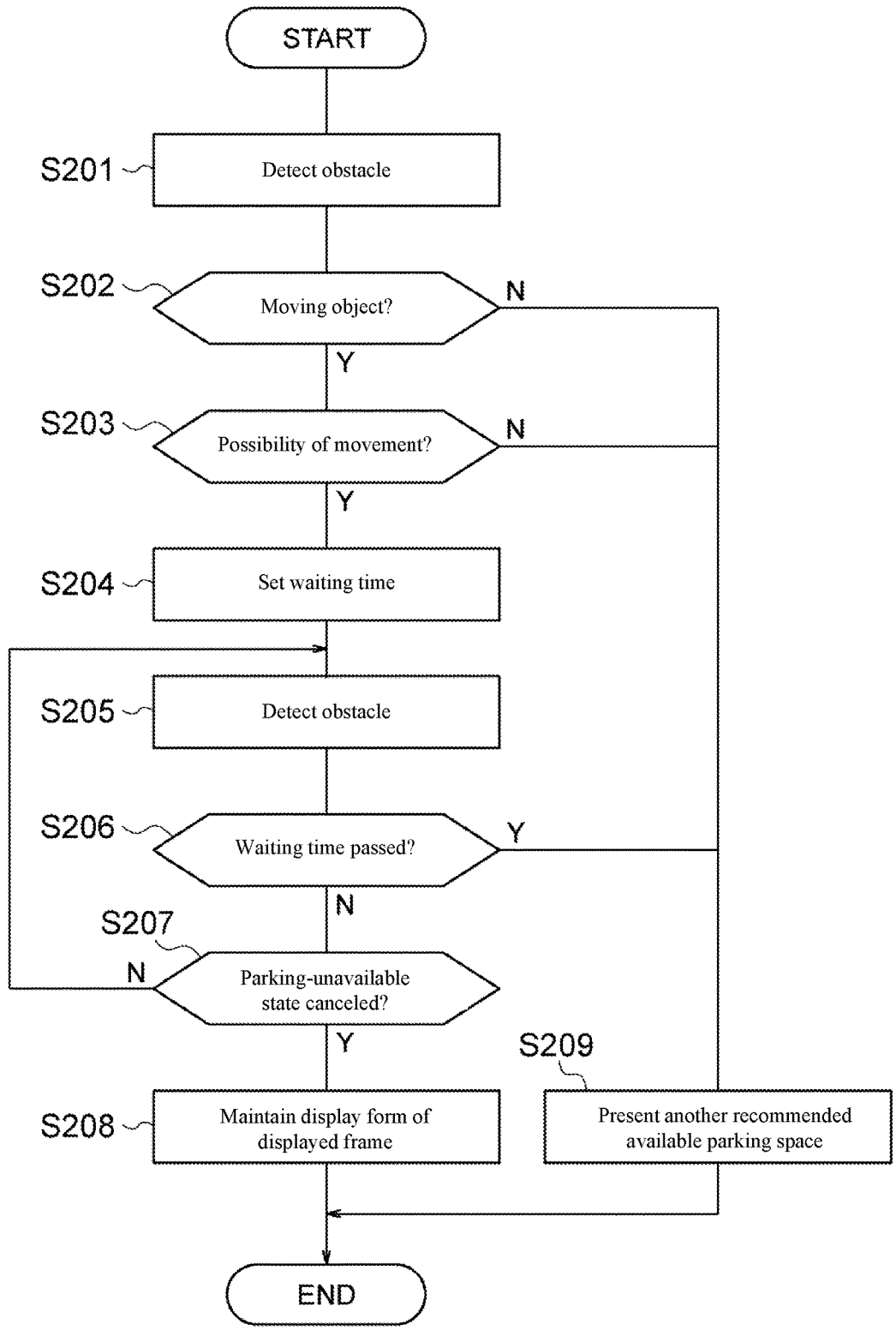
FIG. 9 is a flowchart illustrating an example of a control procedure in the parking assist system according to the first embodiment.

FIG. 9 is a flowchart illustrating a control procedure of the parking assist process executed by the parking assist system 1000 according to the present embodiment. When the recommended available parking space Mr is detected and displayed on the display 21, the control process illustrated in FIG. 9 is triggered to start. The control flow illustrated in FIG. 9 is repeatedly executed at a predetermined period until the target parking space Mo is set.

In step 201, the control device 10 detects whether or not an obstacle exist in the recommended available parking space Mr (or on the travel route L), on the basis of the images captured by the cameras 1a to 1d and/or the data received by the ranging device 3. The detection range for the presence or absence of an obstacle on the travel route L may include an area around the travel route L in addition to the area on the travel route. The area around the travel route L is a range that affects the automated parking from the automated parking start position to the position of the recommended available parking space Mr. That is, when the subject vehicle is parked into the recommended available parking space Mr, the control device 10 detects an obstacle that interferes with the automated driving. When no obstacle is detected, the control flow of step 201 is executed until an obstacle is detected.

In step 202, the control device 10 determines whether or not the detected obstacle is a moving object. To determine whether or not the detected obstacle is a moving object, a vector of the detected obstacle is calculated, and when the magnitude (speed) of the vector is not less than a predetermined value, a determination is made that the detected obstacle is a moving object. In addition or alternatively, provided that images of moving objects to be detected are preliminarily stored, a moving object may be detected by means of a known image processing technique such as pattern matching.

In the above-described step 103, when the available parking spaces Me are detected from the viewpoint of the presence or absence of an obstacle, the parking space to be detected may be in a blind area of the cameras, for example, in a case in which a vehicle stops next to the parking area to be detected. In such a case, an obstacle cannot be detected in the parking space to be detected, and the parking space may be set as an available parking space Me or as the recommended available parking space Mr. When, in step 202, the obstacle is a fixed object such as Color Cone (registered trademark), the routine proceeds to step 209 in which another recommended available parking space Mr is set, and the set other recommended available parking space Mr is displayed on the display 21. Through this operation, when the recommended available parking space Mr is in a blind area and an obstacle cannot be detected, the obstacle is detected again and another recommended available parking space Mr can be displayed thereby to present an appropriate parking space to the driver and passengers in accordance with the obstacle.

In step 203, a determination is made as to whether or not the moving object will move. This possibility of movement is calculated in accordance with the speed of the obstacle. When the speed of the obstacle is lower than a predetermined threshold, a determination is made that there is no possibility of movement because the subject vehicle cannot be parked into the recommended available parking space Mr due to the existence of the obstacle. When the obstacle is specifically specified by the detection of step 201, the possibility of movement is calculated in accordance with an attribute of the specified obstacle. The attribute is for classifying a vehicle, animal, person, etc., for example, and is preliminarily set. For example, when a vehicle is specified as the obstacle within the recommended available parking space Mr, the vehicle may be parked in the recommended available parking space Mr, and the possibility that the vehicle moves out of the recommended available parking space Mr is low. In such a case, the control device 10 determines that there is no possibility of movement. When a determination is made that there is no possibility of movement, the routine proceeds to step 209. The control flow from step 201 to step 203 allows for detection as to whether the subject vehicle cannot be parked into the recommended available parking space Mr due to the existence of an obstacle (this state is also referred to as a "parking-unavailable state," hereinafter).

In step 204, the control device 10 sets a waiting time. The waiting time corresponds to the time from the timing of detecting an obstacle to the timing of changing the displayed frame of the recommended available parking space Mr. The timing of detecting an obstacle is the timing of executing the control flow of step 201. The timing of changing the displayed frame is the timing of changing the displayed frame of the recommended available parking space Mr, which is once displayed on the display screen of the display 21, to the position of another recommended available parking space Mr.

Figure 10:
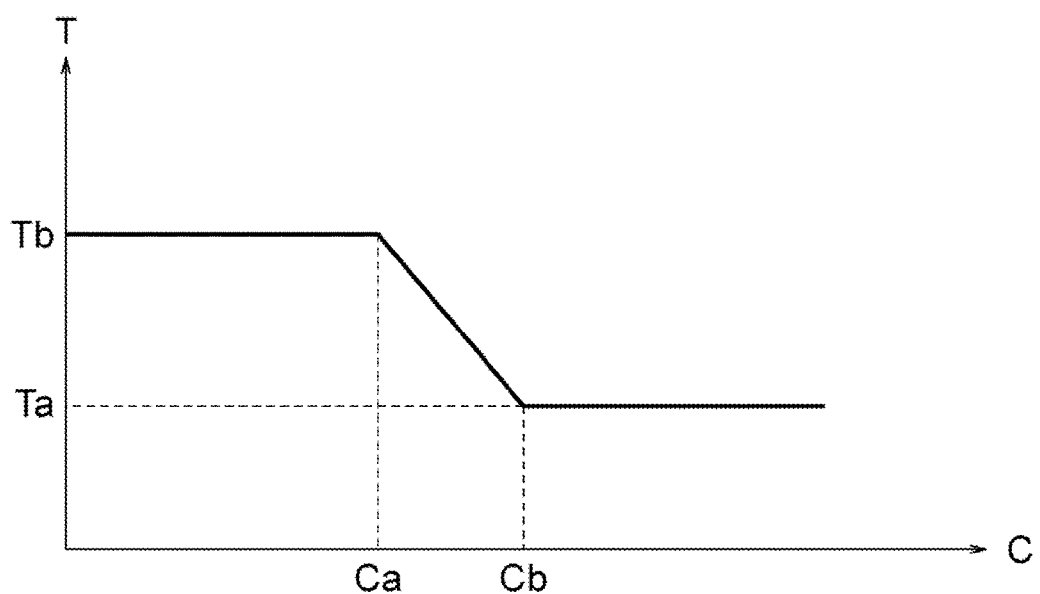
FIG. 10 is a graph illustrating the relationship between the size of an obstacle (C) and the waiting time (T)

FIG. 10 is a graph illustrating the relationship between the size of an obstacle and the waiting time. In FIG. 10, C represents the size of an obstacle and T represents the waiting time. The size of an obstacle is represented by the area or volume of the obstacle.

As illustrated in FIG. 10, when the size of an obstacle is less than Ca, the waiting time is Tb (>Ta). When the size of an obstacle is within a range of Ca or more and Cb or less, the waiting time T decreases in proportion to the size of the obstacle. When the size of an obstacle is more than Ca, the waiting time is Ta. When the obstacle is small, such as an animal and person (pedestrian), the speed of movement or the amount of movement is large. When the obstacle is large, such as a vehicle and large-sized luggage, the speed or movement amount when moving is small. When the speed of movement or the amount of movement is large, the possibility of movement of the obstacle is high, and it is therefore better to lengthen the waiting time. On the other hand, when the speed of movement or the amount of movement is small, the possibility of movement of the obstacle is low, and there is therefore no need to set a long waiting time. From such viewpoints, the control device 10 sets a longer waiting time as the obstacle is larger, and sets a shorter waiting time as the obstacle is smaller.

In step 205, the control device 10 detects whether or not an obstacle exists in the recommended available parking space Mr or on the travel route L during the waiting time.

In step 206, a determination is made as to whether or not the set waiting time has passed. When the waiting time has passed, the routine proceeds to step 209.

In step 207, the control device 10 determines whether or not the parking-unavailable state is canceled as the detected obstacle moves. Assume that the obstacle moves out of the recommended available parking space Mr from a state in which the obstacle exists in the recommended available parking space Mr when the waiting time is set. In such a case, as the obstacle moves, a state is obtained in which the subject vehicle can be parked into the recommended available parking space Mr, so that the parking-unavailable state is canceled. Also assume that the obstacle moves outside the travel route L from a state in which the obstacle exists on the travel route L when the waiting time is set. In such a case, as the obstacle moves, a state is obtained in which the subject vehicle can be parked into the recommended available parking space Mr, so that the parking-unavailable state is canceled. When the parking-unavailable state is not canceled, the routine returns to step 205 and an obstacle is detected during the waiting time.

Cancelation of the parking-unavailable state is followed by step 208 in which the control device 10 maintains the display form of the displayed frame of the set recommended available parking space Mr. That is, the control device 10 allows the frame of the recommended available parking space Mr to be displayed at the same parking space as the set recommended available parking space Mr. Through this operation, when the parking-unavailable state is canceled before the waiting time passes, the display form of the recommended available parking space Mr on the display 21 is maintained.

For example, in the example of FIG. 8B, it is assumed that the recommended available parking space Mr is set at the available parking space PL5 and the frame of the recommended available parking space Mr is displayed at the position of the available parking space PL5 on the display screen of the display 21. It is also assumed that the obstacle M2 then moves out of the available parking space PL5 before the set waiting time (waiting time set in accordance with the size of the obstacle M2) passes. In such a case, the control device 10 allows the frame of the recommended available parking space Mr to be displayed at the position of the available parking space PL5 on the display screen of the display 21.

In step 209, the control device 10 sets another recommended available parking space Mr different from the set recommended available parking space Mr and controls the display 21 to display the other recommended available parking space Mr. That is, the control device 10 allows the frame of the recommended available parking space Mr to be displayed at an available parking space different from the set recommended available parking space Mr. Detection and presentation of the other recommended available parking space Mr may be performed by executing the same control flow as in steps 104 and 105 illustrated in FIG. 2. Through this operation, when the parking-unavailable state is not canceled before the waiting time passes, the other recommended available parking space Mr different from the recommended available parking space Mr displayed on the display 21 is set, and the other recommended available parking space Mr is displayed on the display 21.

For example, in the example of FIG. 8C, it is assumed that the recommended available parking space Mr is set at the available parking space PL5 and the frame of the recommended available parking space Mr is displayed at the position of the available parking space PL5 on the display screen of the display 21. It is also assumed that the obstacle M3 stays on the travel route L even after the set waiting time (waiting time set in accordance with the size of the obstacle M3) passes. In such a case, the control device 10 sets a parking space closest to the gaze point G8 among a plurality of available parking spaces Me that do not include the parking space PL5, as a new recommended available parking space Mr. In the example of FIG. 8C, the parking space PL6 is set as the new recommended available parking space Mr. The parking-related cost and the identification number are assigned to each available parking space Me so as to be associated therewith, and a parking space with the identification number assigned next to the parking space PL5 may be set as the new recommended available parking space Mr. Then, the control device 10 allows the frame of the recommended available parking space Mr to be displayed at the position of the parking space PL6 on the display screen of the display 21.

The above control flow from step 201 to step 209 has been described on the assumption that it is executed after the recommended available parking space Mr is set and before the target parking space Mo is set. As will be described below, the control flow from step 201 to step 209 may be executed after the target parking space Mo is set. In the case in which the control flow from step 201 to step 209 is executed after the target parking space Mo is set, when a determination is made in step 207 as to whether the parking-unavailable state is canceled, the parking space to be determined may be the target parking space Mo instead of the recommended available parking space Mr. This control flow will be described below with reference to a specific example.

Figure 8D:
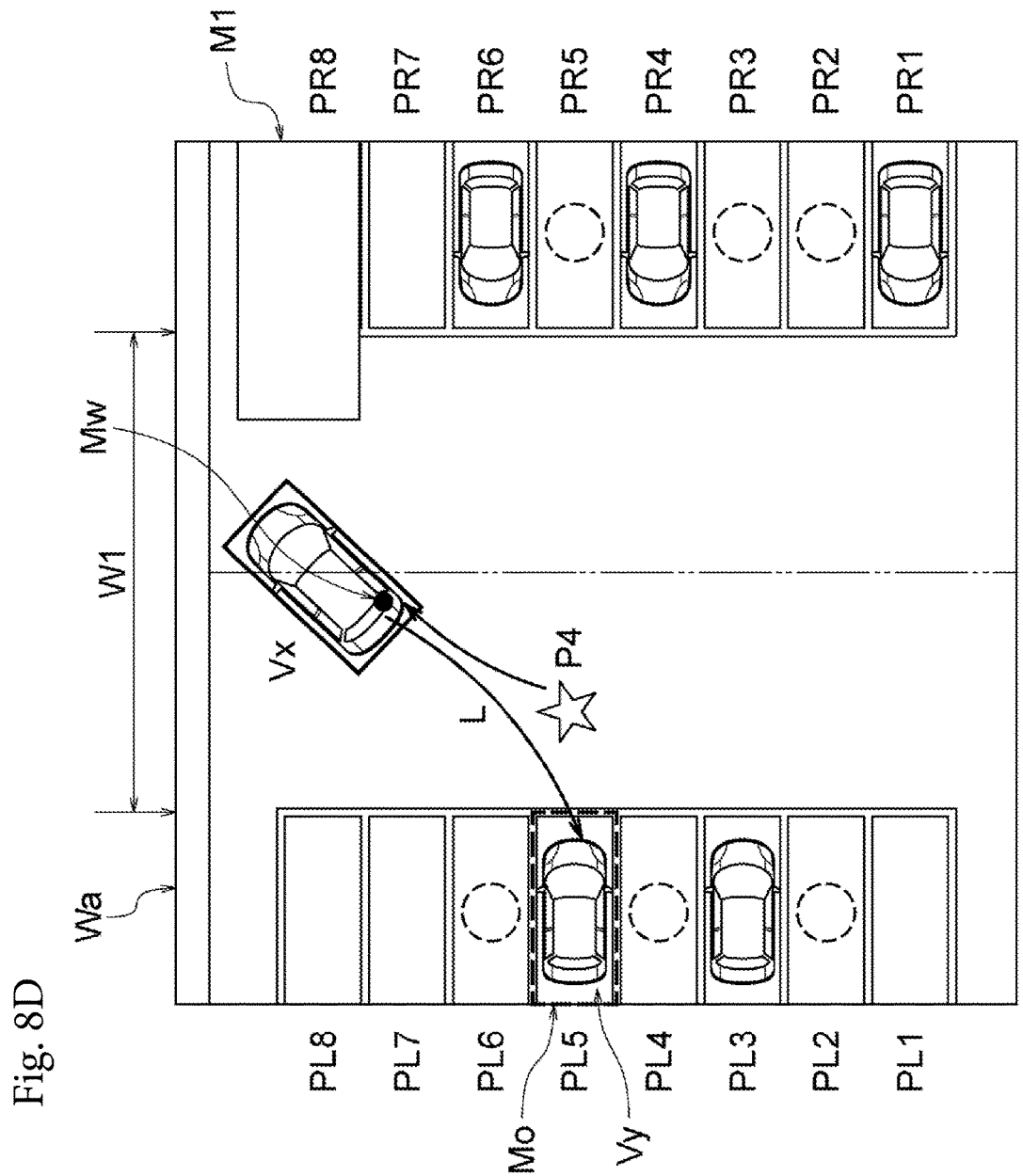
FIG. 8D is a fourth view for describing an example of the parking assist process according to the embodiment.

FIG. 8D is a fourth view for describing an example of the parking assist process according to the present embodiment. What is illustrated in FIG. 8D is a situation in which parking is performed by the automated driving. In FIG. 8D, P4 represents the parking assist start position, Mw represents the turning position, Vx represents the subject vehicle, and Vy represents another vehicle.

It is assumed that, when the subject vehicle Vx moves by the automated driving on the travel route L from the parking assist start position (P4), another vehicle Vy is parked in the target parking space Mo. As illustrated in FIG. 8D, the subject vehicle Vx moves toward the available parking space PL5 which is set as the target parking space Mo, but the driver of the other vehicle Vy is not aware of the operation of the automated driving of the subject vehicle Vx, and the other vehicle Vy is parked in the available parking space PL5 prior to the subject vehicle Vx. In such a case, the subject vehicle Vx cannot be parked into the target parking space Mo due to the existence of the other vehicle Vy. It is therefore better to present another recommended available parking space Mr to the user as substitute for the parking spaces PL5.

After setting the target parking space Mo, the control device 10 executes the control flow from step 201 to step 209. In FIG. 8D, when the other vehicle Vy is parked in the parking space PL5, the other vehicle Vy is detected as a moving object with no possibility of movement. In the control flow of step 203, therefore, the routine proceeds to "No." In step 209, the control device 10 sets another recommended available parking space Mr different from the set target parking space Mo and controls the display 21 to present the other recommended available parking space Mr. Through this operation, when the parking-unavailable state is not canceled before the waiting time passes, another recommended available parking space Mr different from the recommended available parking space Mr displayed on the display 21 is set, and the display 21 is controlled to display the other recommended available parking space Mr.

In FIG. 8D, when the other vehicle Vy is moving for the parking into the parking space PL5, the other vehicle Vy is detected as a moving object with possibility of movement. In the control flow of step 203, therefore, the routine proceeds to "Yes." In step 204, the waiting time corresponding to the other vehicle Vy is set. The waiting time is a short time (Ta: see FIG. 10) because the other vehicle Vy is a large obstacle. Then, even after the short time (Ta) passes, the subject vehicle Vx cannot be parked into the target parking space Mo due to the existence of the other vehicle Vy (the parking-unavailable state is not canceled before the waiting time Ta passes), and the routine therefore proceeds to "Yes" in the control flow of step 206. In step 209, another recommended available parking space Mr different from the recommended available parking space Mr displayed on the display 21 is set, and the display 21 is controlled to display the other recommended available parking space Mr.

Another example of an obstacle will be described. Assume that, when the subject vehicle Vx moves by the automated driving on the travel route L from the parking assist start position (P4), a small obstacle such as an animal and person invades into the area of the travel route L or into the target parking space Mo. In such a case, the obstacle is detected as a moving object with the possibility of movement and the routine therefore proceeds to "Yes" in the control flow of step 203. In step 204, the waiting time corresponding to the obstacle is set. The waiting time is a long time (Tb) because the obstacle is a small obstacle such as an animal and person. Then, the parking-unavailable state is canceled due to the movement of the obstacle before the long time (Tb) passes, and the routine therefore proceeds to "Yes" in the control flow of step 207. In step 208, the control device 10 maintains the display form of the displayed frame of the set target parking space Mo.

The control flow from step 201 to step 209 is a flow for the display form of the recommended available parking space Mr, but can also be applied to the display form of an available parking space Me. In the case of controlling the display form of an available parking space Me, when the available parking space Me is detected and displayed on the display 21, the control process illustrated in FIG. 9 is triggered to start. Then, in steps 201 and 205, the control device 10 detects whether or not an obstacle exists in the available parking space Me (instead of the recommended available parking space Mr) or on the travel route L. Objects to be determined in steps 202, 203, and 207 are obstacles existing in the available parking space Me and on the travel route L.

As described above, in the present embodiment, an available parking space is specified and the specified available parking space is displayed on the display 21. In the case of a parking-unavailable state, a determination is made as to whether or not the parking-unavailable state is canceled. When the parking-unavailable state is canceled before the waiting time passes, the display form of the available parking space on the display 21 is maintained. This allows an appropriate parking space to be presented to the driver and passengers in accordance with an obstacle.

In the present embodiment, when a determination is made that the parking-unavailable state is not canceled before the waiting time passes, another available parking space different from the available parking space displayed on the display 21 is set, and the other available parking space is displayed on the display. This allows an appropriate parking space to be presented to the driver and passengers in accordance with an obstacle.

In the present embodiment, the required time for parking when the subject vehicle is parked into an available parking space by automated control with a controller is calculated for each of a plurality of parking spaces, and among a plurality of available parking spaces, the available parking space with which the required time for parking is shorter than a predetermined time is set as another recommended available parking space. Through this operation, when another available parking space is presented, the parking space with which the required time for parking is short can be presented to the driver and passengers.

In the present embodiment, the attribute of an obstacle is detected and the waiting time is set in accordance with the attribute of the obstacle. This allows the parking space to be presented to the driver and passengers at appropriate timing in accordance with the size of the obstacle.

In the present embodiment, the size of an obstacle is detected and the waiting time is set in accordance with the size of the obstacle. This allows the parking space to be presented to the driver and passengers at appropriate timing in accordance with the size of the obstacle.

In the present embodiment, the recommended available parking space displayed on the display 21 is set as the target parking space Mo on the basis of an operation by the driver or passenger of the subject vehicle, the target parking space Mo is displayed on the display 21, detection is made as to whether or not the target parking space Mo is in the parking-unavailable state due to existence of an obstacle, and detection is made as to whether or not the parking-unavailable state is canceled as the obstacle moves before the waiting time (corresponding to the "second time" of the present invention) passes. When the parking-unavailable state is canceled before the waiting time passes, the display form of the target parking space Mo on the display 21 is maintained. This allows an appropriate parking space to be presented to the driver and passengers in accordance with the obstacle.

In the present embodiment, when the control flow from step 201 to step 209 is executed after the target parking space Mo is set, the control device 10 may suspend the automated driving to put the subject vehicle into a stopping state during a period of counting the waiting time. This allows a highly-secure system to be constructed.

In the present embodiment, the number of recommended available parking spaces Mr set by the control device 10 is not limited to one and may be two or more. The number of recommended available parking spaces Mr displayed on the display 21 is also not limited to one and may be two or more.

In the present embodiment, to prevent the display screen of the display 21 from showing an unnatural movement such that the frame of the recommended available parking space Mr returns below on the screen, a hysteresis characteristic is given to the relationship between the vehicle speed and the gaze point distance, but the control may be modified as below. As illustrated in FIG. 4C, the control device 10 sets the parking space PL5 as the recommended available parking space Mr and controls the display 21 to display the recommended available parking space Mr. As the subject vehicle decelerates, the control device 10 sets the parking space PL4 as the recommended available parking space Mr. The control device 10 controls the display 21 to continue to display the parking space PL5 as the recommended available parking space Mr rather than displaying the set parking space PL4. That is, in the setting control for the recommended available parking space Mr, even when the position of an available parking space relatively moves in the direction of approaching the subject vehicle due to decrease of the vehicle speed, the display position of the recommended available parking space Mr is fixed on the display screen of the display 21. This can prevent the unnatural movement of the recommended available parking space Mr.

In the present embodiment, the available parking space Me closest to the gaze point is set as the recommended available parking space Mr, but the available parking space Me with which the distance from the gaze point to the available parking space Me is shorter than a predetermined distance threshold may be set as the recommended available parking space Mr. When there is a plurality of recommended available parking spaces Mr that can be set in accordance with the distances from the gaze point to the available parking spaces Me, a parking space with which the parking-related cost is low may be set as the recommended available parking space Mr.

In the present embodiment, an available parking space is specified and an obstacle within the specified available parking space is detected, but a determination may be made as to whether or not the parking-unavailable state of the available parking space is canceled, without detecting an obstacle. For example, in a given parking area, an available parking space Me is specified from the parking frame at a predetermined period using the captured images. The specified available parking space Me is displayed on the display 21. In the next period, with regard to the parking space specified as the available parking space Me, the parking frame cannot be specified due to disturbance, and the control device 10 determines that this parking space is in the parking-unavailable state. The disturbance is noise caused by raindrops attached to the cameras, light reflected from a puddle in the parking space, etc. Then, the control device 10 specifies the parking frame again for the parking space which was determined to be in the parking-unavailable state. When the parking frame can be successfully specified, the control device 10 determines that the parking-unavailable state is canceled.

Second Embodiment

The parking assist system according to another embodiment of the present invention will be described. In the second embodiment, similarly to the first embodiment, when the subject vehicle detects an obstacle within the recommended available parking space, estimation is made as to whether or not the parking-unavailable state will be canceled. Other configuration is the same as that of the first embodiment, and the description is borrowed herein.

Figure 11:
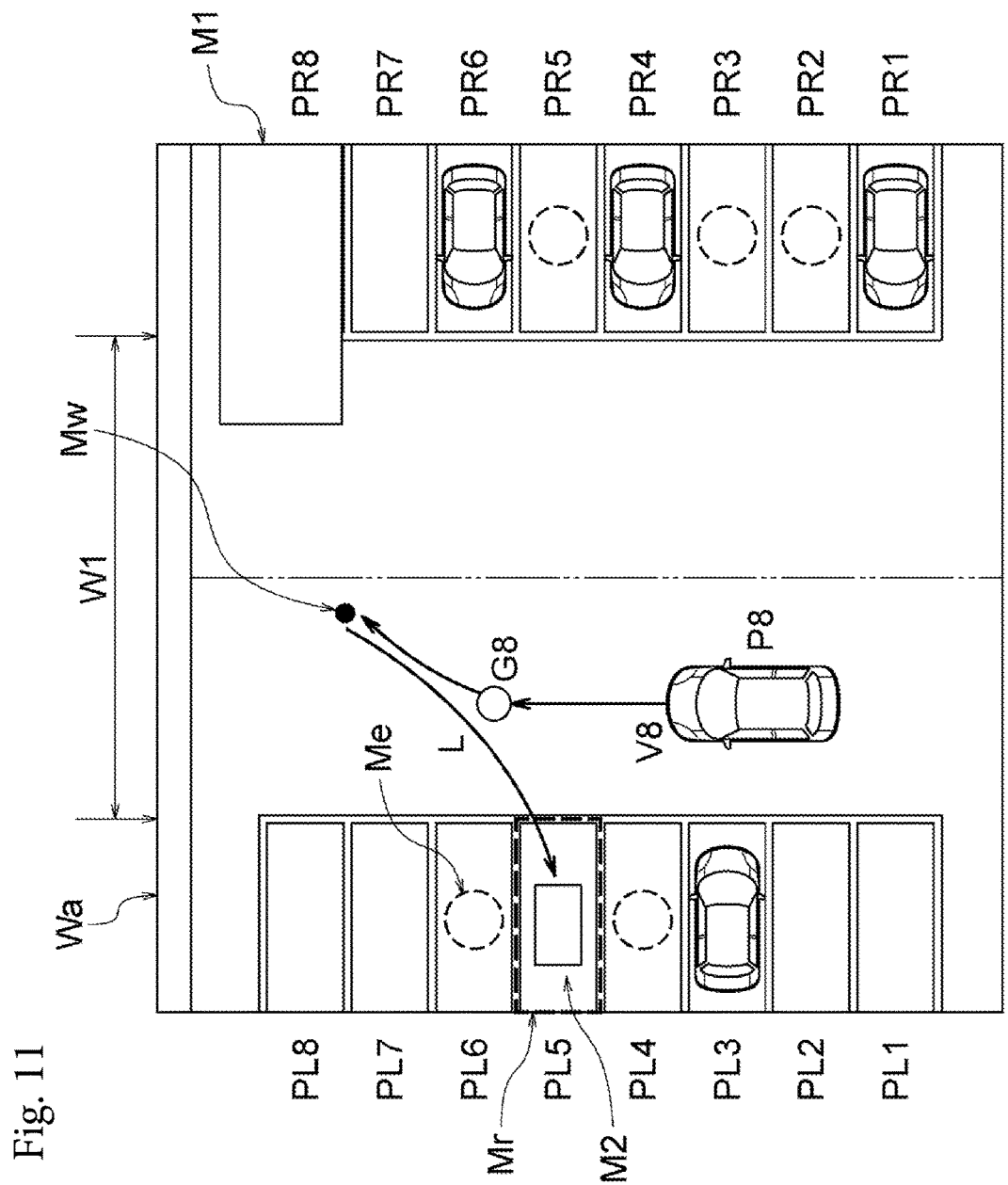
FIG. 11 is a view for describing an example of a parking assist process according to a second embodiment of the present invention.
Figure 12:
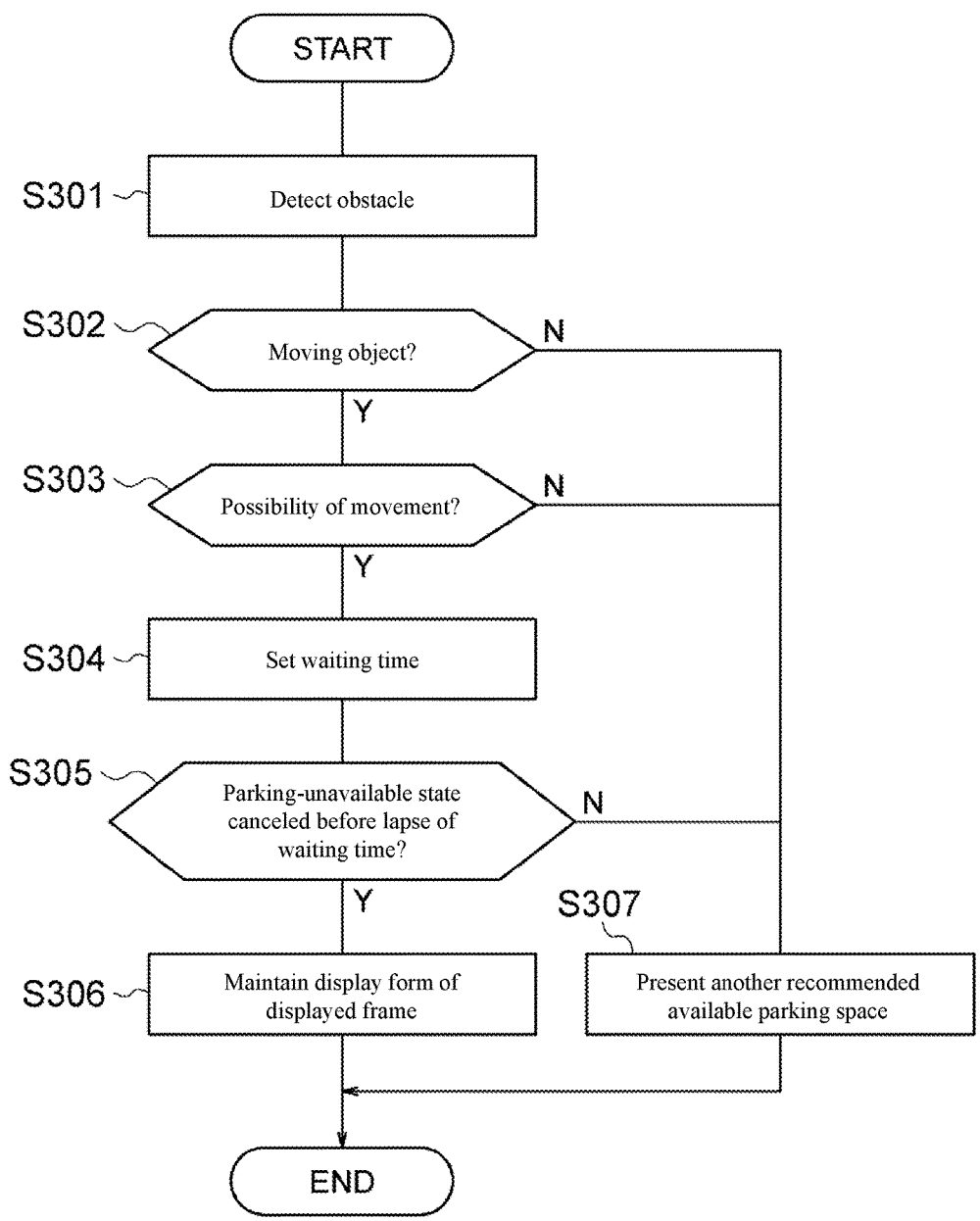
FIG. 12 is a flowchart illustrating an example of a control procedure in the parking assist system according to the second embodiment.

FIG. 11 is a view for describing an example of the parking assist process according to the second embodiment. FIG. 12 is a flowchart illustrating an example of a control procedure in the parking assist system according to the second embodiment.

When the recommended available parking space Mr is detected and displayed on the display 21, the control process illustrated in FIG. 12 is triggered to start. The control flow illustrated in FIG. 12 is repeatedly executed at a predetermined period until the target parking space Mo is set.

In step 301, as in step 201 of FIG. 9 in the first embodiment, an obstacle is detected. When no obstacle is detected, the control flow of step 201 is executed until an obstacle is detected.

In step 302, as in step 202 of FIG. 9 in the first embodiment, the control device 10 determines whether or not the detected obstacle is a moving object.

In step 303, as in step 203 of FIG. 9 in the first embodiment, the control device 10 determines whether or not the moving object will move, that is, determines the possibility of movement of the moving object.

In step 304, as in step 204 of FIG. 9 in the first embodiment, the control device 10 sets the waiting time.

In step 305, the control device 10 estimates whether or not the parking-unavailable state of the recommended available parking space Mr will be canceled before the waiting time passes. The method of estimating whether or not the parking-unavailable state will be canceled includes calculating the distance between the moving obstacle and an end of the recommended available parking space and calculating the moving speed, moving acceleration, and moving direction of the obstacle. Then, it is estimated after how many seconds the obstacle will exit the recommended available parking space Mr (this time will be referred to as an "estimated time," hereinafter). The estimated time corresponds to the time until the obstacle exits the recommended available parking space Mr. When the estimated time for the obstacle is within the waiting time, the control device 10 estimates that the parking-unavailable state of the recommended available parking space Mr will be canceled, and the routine proceeds to step 306. On the other hand, when the estimated time for the obstacle exceeds the waiting time, the control device 10 estimates that the parking-unavailable state will not be canceled, and the routine proceeds to step 307.

When it is estimated that the parking-unavailable state will be canceled, in step 306, as in step 208 of FIG. 9 in the first embodiment, the control device 10 maintains the display form of the displayed frame of the set recommended available parking space Mr. That is, the control device 10 allows the frame of the recommended available parking space Mr to be displayed at the same parking space as the set recommended available parking space Mr. Through this operation, when it is estimated that the parking-unavailable state will be canceled, the display form of the recommended available parking space Mr on the display 21 is maintained.

In step 307, as in step 209 of FIG. 9 in the first embodiment, the control device 10 sets another recommended available parking space Mr different from the set recommended available parking space Mr and controls the display 21 to display the other recommended available parking space Mr. That is, the control device 10 allows the frame of the recommended available parking space Mr to be displayed at a parking space different from the set recommended available parking space Mr.

In step S305, when calculating the estimated time, the control device 10 may take into account the attribute and/or size of an obstacle for the calculation. This can also be applied to a case in which an available parking space is specified without setting the recommended available parking space and the available parking space is displayed.

As described above, in the second embodiment, the specified available parking space is displayed on the display 21. In the case of a parking-unavailable state that represents a state in which the subject vehicle cannot be parked into the available parking space, it is estimated that the parking-unavailable state of the recommended available parking space Mr will be canceled. When it is estimated that the parking-unavailable state will be canceled, the display form of the recommended available parking space on the display is maintained. This allows an appropriate parking space to be presented to the driver and passengers in accordance with an obstacle.

When an obstacle exists on the travel route L or in the vicinity of the travel route L, the control device 10 may calculate a time for the obstacle to move to a position that does not affect the parking of the subject vehicle, as the estimated time.

The control flow from step 301 to step 307 is a flow for the display form of the recommended available parking space Mr, but can also be applied to the display form of an available parking space Me. In the case of controlling the display form of an available parking space Me, when the available parking space Me is detected and displayed on the display 21, the control process illustrated in FIG. 12 is triggered to start. Then, in step 301, the control device 10 detects whether or not an obstacle exists in the available parking space Me (instead of the recommended available parking space Mr) or on the travel route L. Objects to be determined in steps 302, 303, and 305 are obstacles existing in the available parking space Me and on the travel route L.

REFERENCE SIGNS LIST

1000 Parking assist system
100 Parking assist apparatus
  10 Control device
    11 CPU
    12 ROM
    13 RAM
  20 Output device
    21 Display
    22 Speaker
    23 Lamp
1a-1d On-board cameras 2 Image processing device
3 Ranging device
30 Vehicle controller
40 Drive system
50 Steering angle sensor
60 Vehicle speed sensor
V Vehicle
Me Available parking space
Mr Recommended available parking space
Mo Target parking space

The invention claimed is:

1. A parking assist method for assisting parking of a subject vehicle using a parking assist apparatus comprising a controller coupled with sensors that guides the subject vehicle to a parking space and a display that displays the parking space, the parking assist method comprising:
specifying an available parking space into which the subject vehicle can be parked;
displaying the available parking space on the display in a display form that represents that parking is possible;
detecting a state of the available parking space or a state of a travel route for the subject vehicle;
determining whether or not the available parking space comes to a state in which parking is possible before a first waiting time passes on a basis of the detected state of the available parking space or the detected state of the travel route for the subject vehicle; and
when the available parking space comes to the state in which parking is possible, maintaining, on the display, the display form representing that parking is possible.

2. The parking assist method according to claim 1, wherein a determination is made as to whether or not a parking-unavailable state of the available parking space is canceled before the first waiting time passes, and when the parking-unavailable state of the available parking space is canceled, a determination is made that the available parking space comes to the state in which parking is possible before the first waiting time passes.

3. The parking assist method according to claim 2, comprising:
when the available parking space does not come to the state in which parking is possible before the first waiting time passes, changing the display form of the available parking space on the display.

4. The parking assist method according to claim 1, comprising:
when the available parking space does not come to the state in which parking is possible before the first waiting time passes, setting another available parking space different from the available parking space displayed on the display; and
displaying the other available parking space on the display.

5. The parking assist method according to claim 4, comprising:
calculating a required time for parking when the subject vehicle is parked into the available parking space by automated control with the controller, the required time for parking being calculated for each of a plurality of available parking spaces; and
setting the available parking space with which the required time for parking is shorter than a predetermined time, among the plurality of available parking spaces, as the other available parking space.

6. The parking assist method according to claim 1, comprising:
detecting an attribute of an obstacle; and
setting the first waiting time in accordance with the attribute.

7. The parking assist method according to claim 1, comprising:
detecting a size an obstacle; and
setting the first waiting time in accordance with the size of the obstacle.

8. The parking assist method according to claim 1, comprising:
setting the available parking space displayed on the display as a target parking space for the subject vehicle on a basis of an operation by a driver or passenger of the subject vehicle;
displaying the target parking space on the display;
detecting whether or not the target parking space is in a parking-unavailable state that represents a state in which the subject vehicle cannot be parked into the target parking space;
detecting whether or not the parking-unavailable state is canceled as an obstacle moves before a second waiting time passes; and
when the parking-unavailable state is canceled before the second waiting time passes, maintaining a display form of the target parking space on the display.

9. The parking assist method according to claim 1, wherein the available parking space is a recommended available parking space among available parking spaces into which the subject vehicle can be parked, wherein the recommended available parking space is suitable for parking of the subject vehicle in accordance with a traveling state of the subject vehicle.

10. The parking assist method according to claim 1, wherein when the available parking space comes to the state in which parking is possible, the available parking space is maintained to be displayed on the display.

11. The parking assist method according to claim 1, wherein
the state of the available parking space or the state of the travel route for the subject vehicle is detected before starting automated driving that parks the subject vehicle into the available parking space, and
a determination is made as to whether or not the available parking space comes to the state in which parking is possible before the first waiting time passes on the basis of the detected state of the available parking space or the detected state of the travel route for the subject vehicle, wherein the determination is made before starting the automated driving.

12. A parking assist apparatus comprising:
a display that displays a parking space; and
a controller coupled with sensors that guides the subject vehicle to the parking space, the controller:
specifying an available parking space into which the subject vehicle can be parked;
detecting a state of the available parking space or a state of a travel route for the subject vehicle;
determining whether or not the available parking space comes to a state in which parking is possible before a first waiting time passes on a basis of the detected state of the available parking space or the detected state of the travel route for the subject vehicle; and
when the available parking space comes to the state in which parking is possible, maintaining a display form of the available parking space on the display.

* * * * *